United States Patent
Ogawa et al.

(10) Patent No.: US 11,267,761 B2
(45) Date of Patent: Mar. 8, 2022

(54) LIGHT-TRANSMITTING CERAMIC SINTERED BODY AND METHOD FOR PRODUCING SAME

(71) Applicant: AGC Inc., Chiyoda-ku (JP)

(72) Inventors: Shuhei Ogawa, Tokyo (JP); Naomichi Miyakawa, Tokyo (JP); Yasuo Shinozaki, Tokyo (JP); Haruhiko Yoshino, Tokyo (JP); Kazunari Tohyama, Tokyo (JP); Kazuto Ohkoshi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 118 days.

(21) Appl. No.: 16/567,055

(22) Filed: Sep. 11, 2019

(65) Prior Publication Data
US 2020/0002231 A1   Jan. 2, 2020

Related U.S. Application Data

(63) Continuation of application No. PCT/JP2018/009105, filed on Mar. 8, 2018.

(30) Foreign Application Priority Data

Mar. 13, 2017 (JP) .............................. JP2017-047635

(51) Int. Cl.
*C04B 35/117* (2006.01)
*C04B 38/00* (2006.01)
*C04B 38/06* (2006.01)

(52) U.S. Cl.
CPC .......... *C04B 35/117* (2013.01); *C04B 38/007* (2013.01); *C04B 38/0054* (2013.01); *C04B 38/0061* (2013.01); *C04B 38/068* (2013.01); *C04B 2235/3201* (2013.01); *C04B 2235/3203* (2013.01); *C04B 2235/3206* (2013.01); *C04B 2235/3208* (2013.01); *C04B 2235/3217* (2013.01); *C04B 2235/3225* (2013.01); *C04B 2235/3227* (2013.01); *C04B 2235/3293* (2013.01); *C04B 2235/3418* (2013.01); *C04B 2235/3865* (2013.01); *C04B 2235/5436* (2013.01); *C04B 2235/762* (2013.01); *C04B 2235/786* (2013.01); *C04B 2235/9653* (2013.01)

(58) Field of Classification Search
CPC .............. C04B 35/117; C04B 38/0054; C04B 38/0061; C04B 38/007; C04B 2235/3217; C04B 2235/3865; C04B 2235/5436; C04B 2235/762; C04B 2235/9653; C04B 2235/3869
See application file for complete search history.

(56) References Cited

U.S. PATENT DOCUMENTS

| | | |
|---|---|---|
| 2010/0167907 A1 | 7/2010 | Lee et al. |
| 2013/0337993 A1 | 12/2013 | Lee et al. |
| 2015/0115507 A1 | 4/2015 | Sastri et al. |

FOREIGN PATENT DOCUMENTS

| | | | | |
|---|---|---|---|---|
| JP | 2008195581 A | * | 8/2008 | ........... C04B 35/115 |
| JP | 4995920 B2 | | 8/2012 | |
| JP | 2014-508092 A | | 4/2014 | |

OTHER PUBLICATIONS

International Search Report dated May 1, 2018 in PCT/JP2018/009105 filed Mar. 8, 2018 (with English Translation).
Written Opinion dated May 1, 2018 in PCT/JP2018/009105 filed Mar. 8, 2018.

\* cited by examiner

*Primary Examiner* — Noah S Wiese
(74) *Attorney, Agent, or Firm* — Oblon, McClelland, Maier & Neustadt, L.L.P.

(57) ABSTRACT

The present invention relates to a light-transmitting ceramic sintered body which contains air voids having pore diameters of 1 μm or more but less than 5 μm at a density within the range of from 10 voids/mm$^3$ to 4,000 voids/mm$^3$ (inclusive), while having a closed porosity of from 0.01% by volume to 1.05% by volume (inclusive). With respect to this light-transmitting ceramic sintered body, a test piece having a thickness of 1.90 mm has an average transmittance of 70% or more in the visible spectrum wavelength range of 500-900 nm, and the test piece having a thickness of 1.90 mm has a sharpness of 60% or more at a comb width of 0.5 mm.

18 Claims, No Drawings

ABSTRACT# LIGHT-TRANSMITTING CERAMIC SINTERED BODY AND METHOD FOR PRODUCING SAME

TECHNICAL FIELD

The present invention relates to a light-transmitting ceramic sintered body and a production method thereof.

BACKGROUND ART

As the ceramic sintered body having light-transmitting property, for example, an aluminum oxide (alumina/$Al_2O_3$) sintered body and an aluminum oxynitride ($Al_{2+x}O_3N_x$: AlON) sintered body are known. In particular, the crystal structure of the aluminum oxynitride is a cubic structure and therefore, it is theoretically expected that a sintered body having more excellent light-transmitting property than alumina is obtained. Conventionally, a sapphire member having a single crystal structure has been used for a light-transmitting member used in a harsh environment or a light-transmitting member required to be durable against scratches, etc., but since the single crystal sapphire is expensive, studies are being made to use, instead, a light-transmitting ceramic sintered body. It is being studied to apply the light-transmitting ceramic sintered body, for example, to a window member enabling to check the internal state of a semiconductor production apparatus, or a cover member of a watch or an electronic device such as portable digital assistant.

The light-transmitting property of the ceramic sintered body has been conventionally considered to be enhanced by reducing air bubbles as much as possible. For example, aluminum oxynitride is a sintering-resistant material and therefore, it is a common practice to reduce the air bubble amount by applying a hot-press process or an HIP process and in turn, increase the light transmittance. However, when a pressure sintering method such as hot-press process or HIP process is applied, the production cost of the ceramic sintered body increases, and the reflectance is likely to increase as the air bubble amount is reduced. Accordingly, it is being studied to manufacture a light-transmitting ceramic sintered body by applying an inexpensive normal-pressure sintering method. A ceramic sintered body, such as aluminum oxynitride sintered body, manufactured by applying the conventional normal-pressure sintering method has a problem that although the transmittance can be improved to a certain degree in the state of containing air bubbles, visibility through a light-transmitting member can hardly be enhanced.

CITATION LIST

Patent Literature

Patent Literature 1: Japanese Patent No. 4,995,920
Patent Literature 2: JP-T-2014-508092 (the term "JP-T" as used herein means a published Japanese translation of a PCT patent application)
Patent Literature 3: U.S. Patent Application Publication No. 2015/0115507

SUMMARY OF INVENTION

Technical Problem

As described above, among conventional light-transmitting ceramic sintered bodies, a pressure-sintered body has a very low air bubble ratio and excellent transmittance but, on the other hand, has a drawback that the sintered body is expensive due to an increase in the production cost and the reflectance is likely to increase. In contrast, an inexpensive normal-pressure-sintered body can have high transmittance to a certain degree in the state of containing air bubbles but has a disadvantage in that it is difficult to increase the visibility through a light-transmitting member. Here, the transmittance, visibility (legibility), reflectance, etc. of the light-transmitting ceramic body are considered to be affected by air bubbles in the sintered body.

Qualitatively, the more air bubbles are present, the more strongly light is scattered, and therefore the transmittance or visibility is considered to deteriorate. On the other hand, when air bubbles are present, the surface smoothness is reduced, and this is considered to make it possible to keep the reflectance low. In this way, the presence of air bubbles has contradictory effects on the transmittance and visibility (legibility) and on the reflectance, and therefore, in manufacturing a transparent material, it is important to control the existence state of air bubbles according to the purpose. However, how the existence state of air bubbles should be controlled so as to obtain a material with transparency and good visibility has not been clarified. Accordingly, a ceramic sintered body capable of reducing the production cost owing to normal-pressure sintering method and at the same time, having transparency and good visibility despite containing air bubbles is demanded.

An object of the present invention is to provide a light-transmitting ceramic sintered body capable of being manufactured by inexpensive normal-pressure sintering method and moreover, having transparency and good visibility, and a production method thereof.

Solution to Problem

The present invention provides a light-transmitting ceramic sintered body having the following configurations [1] to [16], and a method for producing the light-transmitting ceramic sintered body, having the following configurations [17] to [25].

[1] A light-transmitting ceramic sintered body containing air bubbles each having a pore size of 1 µm or more and less than 5 µm in an amount of 10 bubbles/mm³ or more and 4,000 bubbles/mm³ or less, and having a closed porosity of 0.01 vol % or more and 1.05 vol % or less; and having an average transmittance of a test specimen of the light-transmitting ceramic sintered body having a thickness of 1.90 mm of 70% or more with respect to a visible spectrum with a wavelength of 500 to 900 nm, and a clarity in a comb width of 0.5 mm of a test specimen of the light-transmitting ceramic sintered body having a thickness of 1.90 mm of 60% or more.

[2] A light-transmitting ceramic sintered body containing air bubbles each having a pore size of 1 µm or more and less than 5 µm in an amount of 10 bubbles/mm³ or more and 4,000 bubbles/mm³ or less, and having a closed porosity of 0.01 vol % or more and 1.05 vol % or less; and having an average transmittance of a test specimen of the light-transmitting ceramic sintered body having a thickness of 0.80 mm of 74% or more with respect to a visible spectrum with a wavelength of 500 to 900 nm, and a clarity in a comb width of 0.5 mm of a test specimen of the light-transmitting ceramic sintered body having a thickness of 0.80 mm of 75% or more.

[3] A light-transmitting ceramic sintered body containing air bubbles each having a pore size of 1 µm or more and less than 5 μm in an amount of 10 bubbles/mm³ or more and 4,000 bubbles/mm³ or less, and having a closed porosity of 0.01 vol % or more and 1.05 vol % or less; and having an average transmittance of a test specimen of the light-transmitting ceramic sintered body having a thickness of 0.40 mm of 78% or more with respect to a visible spectrum with a wavelength of 500 to 900 nm, and a clarity in a comb width of 0.5 mm of a test specimen of the light-transmitting ceramic sintered body having a thickness of 0.40 mm of 80% or more.

[4] The light-transmitting ceramic sintered body according to any one of [1] to [3], having a haze of 7% or less with respect to the visible spectrum with the wavelength of 500 to 900 nm.

[5] The light-transmitting ceramic sintered body according to any one of [1] to [4], having a reflectance of 14.5% or less with respect to the visible spectrum with the wavelength of 500 to 900 nm.

[6] The light-transmitting ceramic sintered body according to any one of [1] to [5], in which when air bubbles present in a range of 200 μm in a thickness are projected to overlap each other and observed, air bubbles each having a pore size of 200 nm or more and less than 1 μm are closely clustered in an amount of 6,000 bubbles/mm² or more to form air bubble clusters each having a diameter of 20 μm or more, and the number of air bubble clusters is less than 40 clusters/mm³.

[7] The light-transmitting ceramic sintered body according to any one of [1] to [6], having a main blending component of the light-transmitting ceramic sintered body including 66% or more of $Al_2O_3$ in molar percentage.

[8] The light-transmitting ceramic sintered body according to [7], in which the main blending component of the light-transmitting ceramic sintered body further includes 22% or more and 34% or less of AlN in molar percentage.

[9] The light-transmitting ceramic sintered body according to [7] or [8], including, in mass percentage based on oxides, 0.02% or more and 0.21% or less of $Y_2O_3$.

[10] The light-transmitting ceramic sintered body according to any one of [7] to [9], including, in mass percentage based on oxides, 0.002% or more and 0.19% or less of $Li_2O$.

[11] The light-transmitting ceramic sintered body according to any one of [7] to [10], including, in mass percentage based on oxides, 0.004% or more and 0.23% or less of MgO.

[12] The light-transmitting ceramic sintered body according to any one of [7] to [11], including, in mass percentage based on oxides, 0.002% or more and 0.30% or less of CaO.

[13] The light-transmitting ceramic sintered body according to any one of [7] to [12], including, in mass percentage based on oxides, 0.002% or more and 0.15% or less of at least one selected from the group consisting of $Na_2O$, $SiO_2$, $SnO_2$, and $La_2O_3$.

[14] The light-transmitting ceramic sintered body according to any one of [7] to [13], having a carbon content of 15 ppm by mass or more and 250 ppm by mass or less.

[15] The light-transmitting ceramic sintered body according to any one of [1] to [14], having an average crystal grain size of crystal grains constituting the light-transmitting ceramic sintered body of 60 μm or more and 250 μm or less.

[16] The light-transmitting ceramic sintered body according to any one of [1] to [15], having a crystal structure of a cubic structure.

[17] A method for producing the light-transmitting ceramic sintered body according to any one of [1] to [6], the method including:

a step of preparing a raw material powder by mixing and pulverizing a main blending component powder of the ceramic sintered body, a sintering additive powder, and a carbon source serving as an air bubble source;

a step of obtaining a molded body by pressure-molding the raw material powder;

a step of obtaining a primary sintered body by subjecting the molded body to a primary sintering such that the primary sintered body has a relative density of 96% or more and contains, as essential components, air bubbles each having a pore size of 1 μm or more and less than 5 μm in an amount of 10 bubbles/mm³ or more and 4,000 bubbles/mm³ or less and closed pores in an amount of 0.01 vol % or more and 1.05 vol % or less; and a step of obtaining a secondary sintered body as the light-transmitting ceramic sintered body by subjecting the primary sintered body to a secondary sintering in a normal pressure atmosphere such that the secondary sintered body has a relative density of 98.95% or more.

[18] The method for producing the light-transmitting ceramic sintered body according to [17], in which the step of obtaining a primary sintered body is performed in an atmosphere at not more than a normal pressure.

[19] The method for producing the light-transmitting ceramic sintered body according to [17] or [18], in which the main blending component powder includes, in molar percentage, 66% or more of $Al_2O_3$.

[20] The method for producing the light-transmitting ceramic sintered body according to [19], in which the main blending component powder further includes, in molar percentage, 22% or more and 34% or less of AlN.

[21] The method for producing the light-transmitting ceramic sintered body according to [19] or [20], in which the raw material powder includes, as the sintering additive powder, at least one selected from the group consisting of, in mass percentage based on oxides, 0.02% or more and 0.16% or less of $Y_2O_3$ or a Y compound corresponding to the $Y_2O_3$ amount, 0.02% or more and 0.20% or less of $Li_2O$ or an Li compound corresponding to the $Li_2O$ amount, 0.02% or more and 0.20% or less of MgO or an Mg compound corresponding to the MgO amount, and 0.01% or more and 0.10% or less of CaO or a Ca compound corresponding to the CaO amount, relative to the $Al_2O_3$ amount or a total amount of $Al_2O_3$ and AlN.

[22] The method for producing the light-transmitting ceramic sintered body according to [21], in which the raw material powder further includes, as the sintering additive powder, in mass percentage based on oxides, 0.002% or more and 0.15% or less of at least one selected from the group consisting of $Na_2O$, $SiO_2$, $SnO_2$, and $La_2O_3$, relative to the $Al_2O_3$ amount or a total amount of $Al_2O_3$ and AlN.

[23] The method for producing the light-transmitting ceramic sintered body according to any one of [17] to [22], in which the raw material powder includes the carbon source in an amount of, as a carbon amount, 20 ppm by mass or more and 250 ppm by mass or less.

[24] The method for producing the light-transmitting ceramic sintered body according to any one of [17] to [23], in which the main blending component powder, the sintering additive powder, and the carbon source are mixed and pulverized such that the raw material powder has an average particle diameter of 1.0 μm or less.

[25] The method for producing the light-transmitting ceramic sintered body according to any one of [19] to [24], in which the molded body is subjected to the primary sintering at a temperature of 1,550° C. or more and 1,740° C. or less, and the primary sintered body is subjected to the secondary sintering at a temperature of 1,860° C. or more and 2,040° C. or less.

Advantageous Effects of Invention

The light-transmitting ceramic sintered body of the present invention can be manufactured by inexpensive normal-pressure sintering method and moreover, can be increased in the transparency and visibility. In addition, according to the production method of the present invention, such a light-transmitting ceramic sintered body can be provided at a low cost.

DESCRIPTION OF EMBODIMENTS

The embodiments of the present invention are described below. In the following description, the numerical range expressed using "to" indicates a range including the numerical values before and after "to" as the minimum value and the maximum value, respectively.

The light-transmitting ceramic sintered body according to an embodiment of the present invention contains air bubbles each having a pore size of 1 μm or more and less than 5 μm in the amount of 10 to 4,000 bubbles/mm$^3$, in which the closed porosity is 0.01 vol % or more and 1.05 vol % or less. The light-transmitting ceramic sintered body containing such air bubbles in the amount of 10 to 4,000 bubbles/mm$^3$ not only can be manufactured by a normal-pressure sintering method but also can enhance the transparency, etc. of the sintered body. More specifically, the air bubble having a pore size of 1 μm or more and less than 5 has a large effect on the transmittance of the sintered body. When the number of such air bubbles is 4,000 bubbles/mm$^3$ or less, the light transmission properties such as transmittance and haze (cloudiness) of the ceramic sintered body can be enhanced. The amount of air bubbles each having a pore size of 1 μm or more and less than 5 μm is preferably 3,000 bubbles/mm$^3$ or less, more preferably 2,000 bubbles/mm$^3$ or less, still more preferably 1,000 bubbles/mm$^3$ or less. The ceramic sintered body containing air bubbles each having a pore size of 1 μm or more and less than 5 μm in an amount of 10 bubbles/mm$^3$ or more not only can be manufactured by a normal-pressure sintering method but also can reduce the reflectance and at the same time, can reduce the thermal conductivity, density, etc. The amount of air bubbles each having a pore size of 1 μm or more and less than 5 μm is preferably 30 bubbles/mm$^3$ or more, more preferably 100 bubbles/mm$^3$ or more, still more preferably 200 bubbles/mm$^3$ or more, particularly preferably 250 bubbles/mm$^3$ or more.

The air bubble having a pore size of 5 μm or more affects the transmittance or haze, and the number of such air bubbles is preferably 70 bubbles/mm$^3$ or less, and in this case, the light transmission properties such as transmittance and haze can be enhanced. The number of air bubbles each having a pore size of 5 μm or more is preferably 40 bubbles/mm$^3$ or less, more preferably 20 bubbles/mm$^3$ or less, still more preferably 10 bubbles/mm$^3$ or less, particularly preferably 5 bubbles/mm$^3$ or less. In addition, the volume ratio of the closed porosity affects the reflectance, density, thermal conductivity, thermal shock resistance, etc. When the closed porosity is in the range of 0.01 to 1.05 vol %, besides the reflectance, the density and thermal conductivity can be reduced, and the thermal shock resistance can be enhanced.

In the light-transmitting ceramic sintered body of the embodiment having the above-described air bubbles, it is preferred that the average transmittance in the visible spectrum (wavelength: from 500 to 900 nm) of a test specimen having a thickness of 1.90 mm is 70% or more and the clarity in a comb width of 0.5 mm of a test specimen having a thickness of 1.90 mm is 60% or more. When the average transmittance is 70% or more, the function as a transparent material can be fulfilled. Moreover, when the clarity is 60% or more, the visibility of an image through the light-transmitting ceramic sintered body can thereby be increased. More specifically, when the average transmittance is 70% or more and the clarity is 60% or more, the ceramic sintered body containing air bubbles each having a pore size of 1 μm or more and less than 5 μm in the amount of 10 to 4,000 bubbles/mm$^3$ can exert the function as a transparent member allowing for clear visual recognition or identification of an object, etc. through the member. In other words, when the clarity is 60% or more, in addition to the average transmittance of 70% or more, a light-transmitting ceramic sintered body having practicality as a transparent member can be provided.

The average transmittance of 70% or more can be realized, for example, by setting the number of air bubbles each having a pore size of 1 μm or more and less than 5 μm to be 4,000 bubbles/mm$^3$ or less. Here, the transmittance is a percentage of the transmitted light having passed through a test specimen relative to the incident light entered the test specimen, and in particular, the percentage of transmitted light passing linearly with respect to the incident angle is referred to as linear transmittance. The average transmittance specified in the present description indicates the linear transmittance. As the linear transmittance is higher, a larger amount of light passes and consequently, and whereby an object present on the opposite side appears brighter through the test specimen. The factor affecting the linear transmittance includes, for example, reflection at a material surface, scattering due to air bubbles or grain boundaries, and absorption by impurities or ions. The transmittance is preferably higher in view of visibility for viewing by a human eye. In view of visibility for viewing by a human eye, the transmittance in the visible region is preferably 70% or more, more preferably 74% or more, still more preferably 78% or more, particularly preferably 80% or more.

The clarity of 60% or more in a comb width of 0.5 mm can be realized, for example, by setting the number of air bubble clusters to be less than 40 clusters/mm$^3$. The air bubble clusters which will be described later are 20 μm or more in diameter and each includes air bubbles each having a pore size of 200 nm or more and less than 1 μm in a closely clustered manner in an amount of 6,000 bubbles/mm$^2$ or more. In the following, an air bubble having a pore size of 200 nm or more and less than 1 μm is referred to as an air microbubble, and a cluster of such air bubbles is referred to as an air microbubble cluster. Here, the clarity is a value obtained by quantifying the clarity (image clarity) of an object image observed on the opposite side through a test specimen, and when the clarity is large, the object present on the opposite side of the test specimen is clearly visible without any blurring. In the case where the object present on the opposite side of the specimen is not in contact with but apart from the test specimen, the object is likely to appear blurry, and the clarity is therefore a very important indicator in view of visibility for viewing by a human eye. Above all, for an article having a surface area of at least 200 mm$^2$ or more, which is intended to be viewed by an eye of a human, the clarity is an important indicator for enhancing the visibility. In the case of using the light-transmitting ceramic sintered body as a transparent member, when the clarity is 60% or more, an object present on the opposite side of the light-transmitting ceramic sintered body can be clearly identified without any blurring. The clarity is more preferably 65% or more, still more preferably 70% or more, particularly preferably 73% or more.

In the light-transmitting ceramic sintered body of the embodiment, it is preferred that the average transmittance in the visible spectrum of a test specimen having a thickness of 1.90 mm is 70% or more and the clarity in a comb width of 0.5 mm of a test specimen having a thickness of 1.90 mm is 60% or more.

In addition, it is preferred that the average transmittance in the visible spectrum of a test specimen having a thickness of 0.80 mm is 74% or more and the clarity in a comb width of 0.5 mm of a test specimen having a thickness of 0.80 mm is 75% or more.

Furthermore, it is preferred that the average transmittance in the visible spectrum of a test specimen having a thickness of 0.40 mm is 78% or more and the clarity in a comb width of 0.5 mm of a test specimen having a thickness of 0.40 mm is 80% or more.

With respect to the average transmittance and clarity of each test specimen above (a test specimen of 1.90 mm, a test specimen of 0.80 mm, or a test specimen of 0.40 mm), when a test specimen of at least one thickness satisfies the values, the function as a transparent member can be imparted to the light-transmitting ceramic sintered body. In addition, when test specimens of two thicknesses, furthermore, test specimens of all thicknesses, satisfy the values of the average transmittance and clarity of each test specimen, the function as a transparent member of the light-transmitting ceramic sintered body can be more enhanced.

The average transmittance in the visible spectrum of a test specimen having a thickness of 1.90 mm is more preferably 74% or more, still more preferably 78% or more, particularly preferably 80% or more. The clarity in a comb width of 0.5 mm of a test specimen having a thickness of 1.90 mm is more preferably 65% or more, still more preferably 70% or more, particularly preferably 73% or more. The average transmittance in the visible spectrum of a test specimen having a thickness of 0.80 mm is more preferably 78% or more, still more preferably 80% or more, particularly preferably 82% or more. The clarity in a comb width of 0.5 mm of a test specimen having a thickness of 0.80 mm is more preferably 79% or more, still more preferably 83% or more, particularly preferably 87% or more. The average transmittance in the visible spectrum of a test specimen having a thickness of 0.40 mm is more preferably 80% or more, still more preferably 82% or more, particularly preferably 84% or more. The clarity in a comb width of 0.5 mm of a test specimen having a thickness of 0.40 mm is more preferably 84% or more, still more preferably 88% or more, particularly preferably 92% or more.

Furthermore, in the light-transmitting ceramic sintered body of the embodiment, with respect to linearly transmitted light when light in the visible spectrum is passed through a test specimen having a thickness of 1.90 mm, the ratio of diffused light diffusing at an angle of 1° relative to linearly transmitted light is preferably 0.80% or more and less than 2.50%, the ratio of diffused light diffusing at an angle of 2° relative to linearly transmitted light is preferably 0.10% or more and less than 0.25%, and the ratio of diffused light diffusing at an angle of 3° relative to linearly transmitted light is preferably 0.02% or more and less than 0.10%. These ratios of diffused light to linearly transmitted light are considered to affect the clarity of the light-transmitting ceramic sintered body. The clarity of the light-transmitting ceramic sintered body can be enhanced by satisfying the above-described ratios of diffused light to linearly transmitted light.

In the light-transmitting ceramic sintered body of the embodiment, the haze in the visible spectrum with a wavelength of 500 to 900 nm of a test specimen having a thickness of 1.90 mm is preferably 7% or less. Here, the haze is a percentage of diffusion transmittance relative to total transmittance of light passed through the test specimen. When the haze value is large, the test specimen appears cloudy. The factor affecting the haze includes scattering due to air bubbles or grain boundaries. In all test specimens, the haze is preferably smaller, but in view of visibility for viewing by a human eye, there is less of a need to excessively reduce the haze to less than 0.7%. In view of visibility for viewing by a human eye, the haze in the visible spectrum is preferably 7% or less, more preferably 6% or less, still more preferably 5% or less, particularly preferably 4.5% or less. In particular, the haze in the visible spectrum of a test specimen having a thickness of 0.80 mm is preferably 6% or less, and the haze in the visible spectrum of a test specimen having a thickness of 0.40 mm or less is preferably 4.5% or less. The light-transmitting ceramic sintered body of the embodiment can satisfy the above-described haze by being controlled with the size, amount, etc. of air bubbles.

In the light-transmitting ceramic sintered body of the embodiment, the reflectance (average reflectance in the visible spectrum with a wavelength of 500 to 900 nm) is preferably 14.5% or less. Here, the reflectance is a percentage of light reflected without passing through a test specimen relative to the incident light entered the test specimen. If the reflectance is large, light is reflected at the test specimen and consequently, the visibility is reduced. The factor affecting the reflectance includes refractive index, surface smoothness, etc., and as the refractive index is larger or the surface is smoother, the reflectance increases. The reflectance is preferably lower in view of visibility for viewing by a human eye. In view of visibility for viewing by a human eye, the reflectance in the visible spectrum is preferably 14.5% or less, more preferably 14.2% or less, still more preferably 13.8% or less, particularly preferably 13.5% or less. The light-transmitting ceramic sintered body of the embodiment can satisfy the above-described reflectance by being controlled with the size, amount, etc. of air bubbles.

The average transmittance (linear transmittance), clarity, haze and reflectance (average reflectance) specified in the present description indicate the values measured as follows. The linear transmittance and reflectance are measured using an angle-dependent spectrometer "ARM-500N" manufactured by JASCO Corporation. The linear transmittance and reflectance are measured at an incident angle of 0° and an incident angle of 5°, respectively, in the wavelength region of 200 to 2,000 nm, and the average transmittance and average reflectance are determined from average values of transmittance and reflectance at a wavelength of 500 to 900 nm. As for the clarity, an optical comb (optical comb width: 0.5 mm) perpendicular to a ray axis of transmitted light through a test specimen is moved, and the amount of light (M) when a transmission portion of the comb exists on the ray axis and the amount of light (m) when a shading portion of the comb exists on the ray axis are determined. The ratio ($\{(M-m)/(M+m)\} \times 100(\%)$) of the difference (M−m) therebetween to the sum (M+m) of these two amounts is taken as the clarity. The clarity is measured using an image clarity measuring device "ICM-1T" manufactured by Suga Test Instruments Co., Ltd. in accordance with JIS K7374:2007. The haze is measured using a haze meter "Model HM-65L2" manufactured by Murakami Color Research Laboratory Co., Ltd. in accordance with JIS K7136:2000.

In the light-transmitting ceramic sintered body of the embodiment, with respect to a test specimen having a thickness of 1.90 mm, the number of air microbubble clusters is preferably less than 40 clusters/mm$^3$. The air microbubble clusters are 20 μm or more in diameter (the maximum dimension) and when air bubbles present in the range of 200 μm in thickness are projected to overlap each other and observed, air microbubbles each having a pore size of 200 nm or more and less than 1 μm are closely clustered in an amount of 6,000 bubbles/mm$^2$ or more to form the air microbubble cluster. The air microbubbles each having the above-described pore size greatly affect the clarity of the light-transmitting ceramic sintered body. More specifically, air microbubbles each having a pore size of 200 nm or more and less than 1 μm do not so much affect the transmittance of the sintered body, but when such air microbubbles are present in a clustered manner, the clarity of the sintered body is likely to be reduced. In this respect, when the number of clusters of 20 μm or more in diameter each formed of air microbubbles each having the above-described pore size which are closely clustered in an amount of 6,000 bubbles/mm$^2$ or more, is less than 40 clusters/mm$^3$, the clarity of the light-transmitting ceramic sintered body can be increased. The number of air microbubble clusters is more preferably less than 30 clusters/mm$^3$, still more preferably less than 20 clusters/mm$^3$, particularly preferably less than 10 clusters/mm$^3$.

The number of air bubbles each having a pore size of 1 μm or more and less than 5 μm, the closed porosity, and the number of air microbubble clusters, specified in the present description, indicate the values measured as follows. As for the number of air bubbles each having a pore size of 1 μm or more and less than 5 μm, a sample is observed with a digital microscope, and air bubbles are counted using an image processor. Specifically, the range of 200 μm in thickness at an arbitrary place of a sample is scanned at intervals of 1 μm using a digital microscope VHX-1000 (manufactured by Keyence Corporation) at a magnification of 300 times, and the images are projected to overlap each other to obtain an image for counting the number of bubbles. The same operation is repeated by changing the position on the sample to obtain images in the range of 10 mm$^2$, these images are read into an image processing software Win-ROOF (produced by MITANI Corporation), the number of bubbles is counted by performing binarization processing, and the number density is calculated from the obtained number of bubbles. The closed porosity is measured by the Archimedes method. As for the number of air microbubble clusters, the range of 200 μm in thickness at an arbitrary place of a sample is scanned at intervals of 1 μm using a digital microscope VHX-5000 (manufactured by Keyence Corporation) at a magnification of 3,000 times, and the images are projected to overlap each other to obtain an image for counting the number of bubbles. The same operation is repeated by changing the position on the sample to obtain images in the range of 5 mm$^2$, and the number of clusters of 20 μm or more in diameter each formed of air bubbles each having a pore size of 200 nm or more and less than 1 μm which are closely clustered in an amount of 6,000 bubbles/mm$^2$ or more, is visually counted.

In the light-transmitting ceramic sintered body of the embodiment, the average crystal grain size of crystal grains constituting the sintered body that is a polycrystalline body is preferably 60 μm or more and 250 μm or less. When the average crystal grain size of crystal grains is 60 μm or more, crystal grain boundaries serving as a cause of light scattering are relatively reduced, so that the transmittance, haze, etc. of the ceramic sintered body can be improved. In addition, when the average crystal grain size of crystal grains is 250 μm or less, the strength, hardness, etc. of the ceramic sintered body can be increased while improving the transmittance, haze, etc. The lower limit value of the average crystal grain size of the crystal grains is more preferably 80 μm, still more preferably 100 μm, particularly preferably 120 μm. The upper limit value of the average crystal grain size of crystal grains is more preferably 230 μm, still more preferably 210 μm, particularly preferably 190 μm.

The composition of the light-transmitting ceramic sintered body of the embodiment is not particularly limited, but from the viewpoint of obtaining the above-described transmittance, haze, etc., an oxide-based sintered body containing aluminum oxide (alumina/$Al_2O_3$) as a main blending component is preferred. Specifically, the main blending component of the light-transmitting ceramic sintered body preferably contains 66 mol % or more of $Al_2O_3$. Furthermore, the main blending component of the light-transmitting ceramic sintered body of the embodiment preferably contains from 22 to 34 mol % of AlN, in addition to 66 mol % or more of $Al_2O_3$. Here, the main blending component indicates $Al_2O_3$ and AlN each serving as a basis for calculation when mixing raw material powders. Incidentally, the maximum value of the total amount of $Al_2O_3$ and AlN is 100% and in the calculation of mass ratio of raw material powders, forms the denominator for percentage calculation (so-called outage calculation). Such a ceramic sintered body containing $Al_2O_3$ and AlN, i.e., a sintered body of aluminum oxynitride (AlON) that is a compound obtained by reacting $Al_2O_3$ and AlN in a predetermined ratio, has a cubic crystal structure and therefore, can be more improved in the light-transmitting property than an alumina sintered body.

The crystal structure of the light-transmitting ceramic sintered body of the embodiment is preferably a cubic structure. The cubic structure as used herein encompasses a spinel structure. In the case where the crystal structure is a cubic structure, the refractive index is free of crystal orientation dependency, so that the light-transmitting property of the ceramic sintered body can be increased. Incidentally, the light-transmitting ceramic sintered body of the embodiment is not limited to an aluminum oxynitride sintered body and may be, for example, an MgAlON sintered body containing from 15 to 23 mol % of Mg, an LiAlON sintered body containing from 0.6 to 2.5 mol % of Li, an $MgAl_2O_4$ sintered body, or a cubic $ZrO_2$ sintered body.

The aluminum oxynitride sintered body preferably contains at least one oxide selected from the group consisting of yttrium oxide ($Y_2O_3$), lithium oxide ($Li_2O$), magnesium oxide (MgO), and calcium oxide (CaO), each functioning as a sintering additive. The content of yttrium oxide ($Y_2O_3$) in the ceramic sintered body is preferably from 0.02 to 0.21% in mass percentage based on oxides. When yttrium oxide is incorporated in such an amount, sinterability of the aluminum oxynitride sintered body is enhanced and the number of air microbubble clusters can be reduced while controlling the amount of air bubbles each having a pore size of 1 μm or more and less than 5 μm. The lower limit value of the content of yttrium oxide ($Y_2O_3$) is more preferably 0.04 mass %, still more preferably 0.06 mass %, particularly preferably 0.07 mass %. The upper limit value of the content of yttrium oxide ($Y_2O_3$) is more preferably 0.16 mass %, still more preferably 0.12 mass %, particularly preferably 0.09 mass %.

The content of lithium oxide ($Li_2O$) in the ceramic sintered body is preferably from 0.002 to 0.19% in mass percentage based on oxides so as to obtain the same effects as the reason of containing yttrium oxide. The lower limit value of the content of lithium oxide ($Li_2O$) is more preferably 0.004 mass %, still more preferably 0.007 mass %, particularly preferably 0.010 mass %. The upper limit value of the content of lithium oxide ($Li_2O$) is more preferably 0.12 mass %, still more preferably 0.065 mass %, particularly preferably 0.025 mass %.

The content of magnesium oxide (MgO) in the ceramic sintered body is preferably from 0.004 to 0.23% in mass percentage based on oxides so as to obtain the same effects as the reason of containing yttrium oxide. The lower limit value of the content of magnesium oxide (MgO) is more preferably 0.04 mass %, still more preferably 0.07 mass %, particularly preferably 0.09 mass %. The upper limit value of the content of magnesium oxide (MgO) is more preferably 0.18 mass %, still more preferably 0.15 mass %, particularly preferably 0.12 mass %.

The content of calcium oxide (CaO) in the ceramic sintered body is preferably from 0.002 to 0.30% in mass percentage based on oxides so as to obtain the same effects as the reason of containing yttrium oxide. The lower limit value of the content of calcium oxide (CaO) is more preferably 0.008 mass %, still more preferably 0.010 mass %, particularly preferably 0.012 mass %. The upper limit value of the content of calcium oxide (CaO) is more preferably 0.15 mass %, still more preferably 0.10 mass %, particularly preferably 0.060 mass %.

All of yttrium oxide, lithium oxide, magnesium oxide, and calcium oxide exhibit the same effects and any of these materials may be used, but it is preferable to use at least one selected from yttrium oxide, lithium oxide, and magnesium oxide. It is more preferable to use lithium oxide in combination with other materials, and in this case, the effects of controlling and reducing air bubbles are easily obtained. With respect to such a combination, in the case of using lithium oxide in combination with magnesium oxide, the mass ratio (MgO/$Li_2O$ ratio) of MgO to $Li_2O$ is preferably controlled in the range of 0.4 or more and 20 or less. By controlling the MgO/$Li_2O$ ratio in the range above, the effects of controlling and reducing air bubbles can be increased.

The aluminum oxynitride sintered body to which the light-transmitting ceramic sintered body of the embodiment is applied may further contain at least one selected from the group consisting of sodium oxide, silicon oxide, tin oxide, and lanthanum oxide. The compounds are effective in controlling the amount of air bubbles each having a pore size of 1 or more and less than 5 μm or reducing the number of air microbubble clusters. The content of sodium oxide ($Na_2O$), silicon oxide ($SiO_2$), tin oxide ($SnO_2$), and lanthanum oxide ($La_2O_3$) is preferably from 0.002 to 0.15% in mass percentage based on oxides. In the case of containing two or more compounds, the content above is the total content thereof. The lower limit value of the total content of the compounds above is more preferably 0.010 mass %, still more preferably 0.020 mass %, particularly preferably 0.040 mass %. The upper limit value of the total content of the compounds above is more preferably 0.13 mass %, still more preferably 0.10 mass %, particularly preferably 0.08 mass %.

The aluminum oxynitride sintered body to which the light-transmitting ceramic sintered body of the embodiment is applied preferably contains 15 ppm by mass or more and 250 ppm by mass or less of carbon (C). The compound, etc. containing carbon serves as an air bubble source in the later-described production step of the aluminum oxynitride sintered body, but, for example, when the residual carbon amount of such a carbon source is controlled in the range of 15 to 250 ppm by mass, the amount of air bubbles each having a pore size of 1 μm or more and less than 5 μm can be controlled in the amount of 10 to 4,000 bubbles/$mm^3$, so that the transmittance or clarity of the aluminum oxynitride sintered body can be increased. The lower limit value of the carbon content is more preferably 20 ppm by mass, still more preferably 25 ppm by mass, particularly preferably 30 ppm by mass. The upper limit value of the carbon content is more preferably 200 ppm by mass, still more preferably 100 ppm by mass, particularly preferably 60 ppm by mass.

The aluminum oxynitride sintered body to which the light-transmitting ceramic sintered body of the embodiment is applied basically includes a compound (AlON) of $Al_2O_3$ and AlN which are main blending components; at least one selected from the group consisting of $Y_2O_3$, $Li_2O$, MgO, and CaO each functioning as a sintering additive; at least one selected from the group consisting of $Na_2O$, $SiO_2$, $SnO_2$, and $La_2O_3$; and carbon. The aluminum oxynitride sintered body may contain components other than them as impurities, but the impurity amount is preferably controlled to 0.3 mass % or less. The impurity amount in the aluminum oxynitride sintered body is more preferably 0.2 mass % or less, particularly preferably 0.1 mass % or less.

Furthermore, in the aluminum oxynitride sintered body to which the light-transmitting ceramic sintered body of the embodiment is applied, it is preferred that the thermal conductivity at 21° C. is less than 12.5 W/m·K, the bending strength of a test specimen after being charged into water at 20° C. from 300° C. is 40 MPa or more, the Vickers hardness is 13.8 GPa or more, and the bending strength is 200 MPa or more. These various properties can be obtained by controlling the air bubble amount, form, composition, etc. of the aluminum oxynitride sintered body of the embodiment. Thanks to these properties, in the case of applying the light-transmitting ceramic sintered body to a member assumed to be used at high temperatures or a member required to have heat resistance, thermal shock resistance, scratch resistance, etc., the reliability, durability, functionality, etc. of the member (ceramic sintered body) can be enhanced.

The thermal conductivity, bending strength after quenching, Vickers hardness, and bending strength as used in the present description indicate the values measured as follows. The thermal conductivity is measured at a temperature of 21° C. using a laser flash thermophysical property measuring apparatus "MODEL LFA-502" manufactured by Kyoto Electronics Manufacturing Co., Ltd. The Vickers hardness is measured by indentation for 15 seconds under an indentation load of 10 kgf using a Vickers hardness tester system (manufactured by Nippon Steel Sumitomo Metal Corporation). The bending strength is measured at 25° C. by a three-point bending test using a test specimen having a width of 4 mm, a height of 3 mm, and a length of 50 mm. The bending strength after quenching (thermal shock resistance) is evaluated by heating a test specimen having a width of 4 mm, a height of 3 mm, and a length of 50 mm at 300° C. for 30 minutes, then charging it into water at 20° C. at a rate of 100 mm/s in a perpendicular manner with the see-through surface vertical to perform quenching, and measuring the three-point bending strength of the test specimen after quenching.

The production method of the light-transmitting ceramic sintered body of the embodiment is not particularly limited, but the light-transmitting ceramic sintered body is produced basically by normal-pressure sintering of a molded body of a mixed powder (raw material powder) containing a main blending component powder of the ceramic sintered body, a sintering additive (sintering aid) powder, and a carbon source serving as an air bubble source. Normal-pressure indicates a pressure range from atmospheric pressure (0.101325 MPa) to 0.13 MPa. The production method of the ceramic sintered body of the embodiment includes, for example, a step of preparing a raw material powder (mixed powder) by mixing a main blending component powder of the ceramic sintered body, a sintering additive powder, and a carbon source serving as an air bubble source; a step of obtaining a molded body by pressure-molding the raw material powder; a step of obtaining a primary sintered body by subjecting the molded body to primary sintering to have a relative density of 96% or more; and a step of obtaining a secondary sintered body as the light-transmitting ceramic sintered body by subjecting the primary sintered body to secondary sintering in a normal pressure atmosphere to have a relative density of 98.95% or more.

Here, in the light-transmitting ceramic sintered body of the embodiment, the factor affecting the number of air bubbles each having a pore size of 1 μm or more and less than 5 μm or the number of air microbubble clusters which are described above is not clearly known, but the number is considered to be affected by the average particle diameter of the raw material powder before firing (primary particle diameter), the remaining amount of carbon serving as an air bubble source, the type or content of the sintering additive (sintering aid), etc. As a representative example of the production method of the light-transmitting ceramic sintered body of the embodiment, the production method of an aluminum oxynitride sintered body is described in detail below.

First, a main blending component powder of the aluminum oxynitride sintered body is prepared. As the main blending component powder of the aluminum oxynitride sintered body, a mixed powder of 66 mol % or more of alumina ($Al_2O_3$) powder and from 22 to 34 mol % of aluminum nitride (AlN) powder is used. An $Al(OH)_3$ powder, etc. may also be used in place of the $Al_2O_3$ powder.

As for the sintering additive, it is preferable to use at least one selected from the group consisting of, in mass percentage based on oxides, 0.02% or more and 0.16% or less of yttrium oxide ($Y_2O_3$) or a Y compound corresponding to the $Y_2O_3$ amount, 0.02% or more and 0.20% or less of lithium oxide ($Li_2O$) or an Li compound corresponding to the $Li_2O$ amount, 0.02% or more and 0.20% or less of magnesium oxide (MgO) or an Mg compound corresponding to the MgO amount, and 0.01% or more and 0.10% or less of calcium oxide (CaO) or a Ca compound corresponding to the CaO amount, relative to the total amount of alumina and aluminum oxynitride. The sintering additive may further contain, in mass percentage based on oxides, from 0.002 to 0.15% of at least one selected from the group consisting of sodium oxide ($Na_2O$), silicon oxide ($SiO_2$), tin oxide ($SnO_2$), and lanthanum oxide ($La_2O_3$), relative to the total amount of alumina and aluminum oxynitride.

Examples of the Y compound, Li compound, Mg compound and Ca compound used as the sintering additive include metal salt compounds, for example, a nitrate such as $Y(NO_3)_3$ and $Mg(NO_3)_2$, and a carbonate such as $Li_2CO_3$, $MgCO_3$ and $CaCO_3$. Among these metal salts, $Mg(NO_3)_2$ is preferably used as a part of the Mg source. Although the cause is not clarified, it is not preferred to use LiF as the Li compound. In addition, with respect to at least one selected from the group consisting of $Na_2O$, $SiO_2$, $SnO_2$, and $La_2O_3$, a carbonate, a nitrate, a chloride, an alkoxide compound, etc. may be used in place of the oxide. The sintering additive is not limited to an oxide powder, a metal salt powder, etc., but a metal powder may also be used.

As the carbon source serving as an air bubble source, for example, a polycarboxylic acid-based polymer, polyethylene glycol, acrylamide, N-[3-(trimethoxysilyl)propyl]diethylenetriamine, and carbon nanopowder can be used. The carbon source is preferably contained in the raw material powder in such an amount as to give a carbon amount of 20 to 250 ppm by mass. By incorporating such an amount of carbon source into the raw material powder, in the light-transmitting ceramic sintered body, the number of air bubbles each having a pore size of 1 μm or more and less than 5 μm and the number of air microbubble clusters can be controlled in the desired ranges.

The main blending component powder of the aluminum oxynitride sintered body, the sintering additive powder, and the carbon source which are described above are mixed in a desired ratio and then pulverized. Pulverization of the mixture is preferably conducted such that the average particle diameter of the raw material powder (mixed•pulverized powder) becomes 1.0 μl or less. The ceramic sintered body is produced using the raw material powder having an average particle diameter of 1.0 μm or less, whereby controllability of the number of air bubbles each having a pore size of 1 μm or more and less than 5 μm or the number of air microbubble clusters, particularly, controllability of the number of air microbubble clusters, can be enhanced. The average particle diameter of the raw material powder is more preferably 0.8 μm or less, still more preferably 0.6 μm or less, particularly preferably 0.4 μm or less. The method for pulverizing the mixture is not particularly limited, but a wet pulverization method such as rotary ball mill or vibration ball mill using an organic solvent such as ethanol for the medium is preferably applied. The mixture is pulverized using such a wet pulverization method for a relatively long time, for example, 72 hours or more, and a raw material powder having an average particle diameter of 1.0 μm or less can thereby be stably obtained. In the case of applying wet pulverization to the pulverization method of the mixture, the obtained slurry is dried to make a raw material powder.

The raw material powder described above is pressure-molded into a desired shape by applying a pressure molding method such as metal mold pressing method and isostatic pressing method, to manufacture a molded body. Particularly, in the case of an aluminum oxynitride sintered body, a mixed powder of an alumina powder and an aluminum nitride powder is reacted to synthesize aluminum oxynitride, and a sintering-resistant aluminum oxy-nitride sintered body is thereby produced. Accordingly, before reacting alumina and aluminum nitride to synthesize aluminum oxynitride, the molded body is preferably compacted, and isostatic pressing capable of manufacturing a high-density molded body is preferably applied to the molding method of the raw material powder.

Next, the pressure-molded body described above is sintered to produce a light-transmitting ceramic sintered body like an aluminum oxynitride sintered body. The step of sintering the molded body preferably has a primary sintering step of sintering the molded body at a relatively low temperature to obtain a primary sintered body, and a secondary sintering step of sintering the primary sintered body at a higher temperature than in the primary sintering step to obtain a secondary sintered body. The primary sintering step of the molded body is conducted in a normal pressure atmosphere or in a reduced pressure atmosphere not more than normal pressure. By conducting the primary sintering step in a reduced pressure atmosphere not more than normal pressure, the compactness of the sintered body can be increased. The primary sintering temperature is preferably set such that the relative density of the primary sintered body becomes 96% or more, and in the case of manufacturing an aluminum oxynitride sintered body, the sintering temperature is preferably set to a temperature of 1,550 to 1,740° C.

The secondary sintering step of the primary sintered body is conducted in a normal pressure atmosphere, and a ceramic sintered body moderately containing air bubbles can thereby obtained at a low cost. The secondary sintering temperature of the primary sintered body is preferably set such that the relative density of the secondary sintered body becomes 98.95% or more, and in the case of manufacturing an aluminum oxynitride sintered body, the sintering temperature is preferably set to a temperature of 1,860 to 2,040° C. By conducting the secondary sintering step at such a temperature, the density of the secondary sintered body can be increased, and controllability of the average crystal grain size of crystal grains constituting the secondary sintered body, the number of air bubbles each having a pore size of 1 μm or more and less than 5 μm, or the number of air microbubble clusters can be enhanced.

The above-described light-transmitting ceramic sintered body of the embodiment is preferably used, for example, as various transparent members requiring heat resistance, weather resistance, scratch resistance, etc. as well as transparency. Specific examples of the transparent member include an exterior member such as cover member of display part of an electronic device or cover member provided for scratch protection, an exterior member such as cover member of an optical device, a plasma-resistant member, a transparent blade, and a transparent abrasion-resistant member.

The electronic device described above is an electric appliance applying electronic engineering technology and includes, for example, a liquid crystal display device, a car navigation system, an in-vehicle display device, a mobile phone, a portable digital assistant, a game machine, a CD player, a DVD player, a digital camera, a TV, an electronic note, an electronic dictionary, a personal computer, a printer, a clock, a photovoltaic generator, a solar thermal generator, smart glasses, and ER and VR devices. The optical device is a device utilizing actions and properties of light and includes, for example, a telescope, a camera, an endoscope, a thermography, a laser, a projector, a barcode reader, and a sensor. The plasma-resistant member includes a member requiring plasma resistance, particularly, a window material, stage, etc. of a semiconductor manufacturing apparatus. The blade is a tool having a structure called a cutting-edge and used to cut (cutting or machining) a target and includes, for example, a knife, a pocketknife, a razor, a kitchen knife, scissors, a scalpel, and a chisel.

EXAMPLES

The present invention is described specifically by referring to Examples, but the present invention is not limited to these Examples. Here, Examples 1 to 27 are Working Examples and Examples 28 to 49 are Comparative Examples.

Example 1

First, an $Al_2O_3$ powder, an AlN powder, a $Y_2O_3$ powder, a $Li_2CO_3$ powder, and a MgO powder each having an average particle diameter of 1.0 μm were prepared. The $Al_2O_3$ powder and the AlN powder were weighed 150 g to achieve a molar ratio of $Al_2O_3$:AlN=70:30; and 0.09 mass % of $Y_2O_3$ powder, 0.07 mass % of $Li_2CO_3$ powder, and 0.15 mass % of MgO powder were further weighed relative to the total amount (150 g) of $Al_2O_3$ powder and AlN powder. Furthermore, 1.5 g (corresponding to 45 to 55 ppm as the remaining carbon amount after firing) of a polycarboxylic acid-based polymer (produced by Chukyo Yushi Co., Ltd., trade name: Celuna D-305) was weighed as a carbon source, and respective raw materials were put in a polyurethane-made pot. These materials were mixed and pulverized for 96 hours in a rotary ball mill (manufactured by Aichi Electric Co., Ltd., trade name: AlN-3S) using high-purity alumina balls of 5 mm in diameter and using 440 ml of anhydrous ethanol as the medium, and the obtained slurry was dried under reduced pressure to obtain a raw material powder. The average particle diameter of the obtained raw material powder was 0.6 μm.

Next, the obtained raw material powder was molded into a disk of 16 mm in diameter and 3 mm in thickness by using a dry single-shaft press and then isostatically pressed at a pressure of 2,000 kg/cm² by using a cold isotropic pressing machine (manufactured by NIKKISO Co., Ltd., trade name: CL15-28-20) to form a molded body. The obtained molded body was put in a carbon-made crucible and held at 1,650° C. for 10 hours under a vacuum atmosphere of 20 Pa in a carbon firing furnace to effect primary firing. After the atmosphere in the firing furnace was changed to a $N_2$ atmosphere at atmospheric pressure, the temperature was raised up to 1,960° C., and the molded body was held at that temperature for 5 hours to effect secondary firing and thereafter, cooled to room temperature to obtain a ceramic sintered body. The temperature rise rate during firing was 220° C./h up to 1,350° C. and 20° C./h at 1,350° C. or more. The cooling rate after firing was 100° C./h down to 1,000° C. and 20° C./h at 1,000° C. or less.

For the ceramic sintered body obtained thus, the amounts of respective components of $Y_2O_3$, $Li_2O$, and MgO, the carbon (C) amount, the fluorine (F) amount, and the amounts of other impurities were measured by an inductively coupled plasma mass spectrometer ICP-MS (manufactured by Shimadzu Corporation). The amount of each of the components $Y_2O_3$, $Li_2O$, and MgO is shown in Table 1 as the mass ratio to the total amount (the amount of main blending components) of $Al_2O_3$ and AlN which are main blending components of the ceramic sintered body. In addition, each of the carbon amount, fluorine amount and the amount of other impurities is shown in Table 1 as the mass ratio to the total amount of the ceramic sintered body. The crystal structure, density and average crystal grain size of the ceramic sintered body are shown in Table 1.

Then, with respect to the obtained ceramic sintered body, the number (bubbles/mm³) of air bubbles each having a pore size of 1 μm or more and less than 5 μm, the closed porosity, the average transmittance of a test specimen having a thickness of 1.90 mm, the clarity in a comb width of 0.5 mm of a test specimen having a thickness of 1.90 mm, the haze of a test specimen having a thickness of 1.90 mm, the reflectance, the number (clusters/mm³) of air microbubble clusters of 20 μm or more in diameter in a test specimen having a thickness of 1.90 mm, each cluster being formed by air microbubbles each having a pore size of 200 nm or more and less than 1 μm which are closely clustered in an amount of 6,000 bubbles/mm² or more, the thermal conductivity, the bending strength after quenching, the Vickers hardness, and the bending strength were measured according to the above-described methods. The measurement results are shown in Table 1. In addition, the average transmittance, the clarity and the haze were measured also on a test specimen having a thickness of 0.80 mm and a test specimen having a thickness of 0.40 mm. Furthermore, the intensity ratio of diffused lights at 1°, 2° and 3° of each test specimen (only 1° for the test specimen of 0.40 mm) was measured according to the above-described method. These measurement results are shown together in Table 1.

Examples 2 to 7

Ceramic sintered bodies were manufactured in the same manner as in Example 1 except that in the production step of the ceramic sintered body of Example 1, the blending amount of $Li_2CO_3$ powder was changed to give the composition shown in Table 1. The amounts of respective components (including the amount of impurities) of each ceramic sintered body, the number of air bubbles, respective physical property values, etc. were measured in the same manner as in Example 1. The results obtained are shown in Table 1.

TABLE 1

| | Example 1 | Example 2 | Example 3 | Example 4 | Example 5 | Example 6 | Example 7 |
|---|---|---|---|---|---|---|---|
| $Al_2O_3$ [mol %] | 70 | 70 | 70 | 70 | 70 | 70 | 70 |
| AlN [mol %] | 30 | 30 | 30 | 30 | 30 | 30 | 30 |
| $Y_2O_3$ [wt %] | 0.082 | 0.081 | 0.086 | 0.088 | 0.077 | 0.083 | 0.07 |
| $Li_2O$ [wt %] | 0.037 | 0.046 | 0.018 | 0 | 0.064 | 0.004 | 0.113 |
| MgO [wt %] | 0.086 | 0.102 | 0.065 | 0.085 | 0.072 | 0.073 | 0.081 |
| MgO/$Li_2O$ Ratio | 3.58 | 2.22 | 3.61 | — | 1.13 | 18.25 | 0.72 |
| CaO [wt %] | 0 | 0 | 0 | 0 | 0 | 0 | 0 |
| $SiO_2$ [wt %] | 0 | 0 | 0 | 0 | 0 | 0 | 0 |
| $Na_2O$ [wt %] | 0 | 0 | 0 | 0 | 0 | 0 | 0 |
| $SnO_2$ [wt %] | 0 | 0 | 0 | 0 | 0 | 0 | 0 |
| $La_2O_3$ [wt %] | 0 | 0 | 0 | 0 | 0 | 0 | 0 |
| C [wtppm] | 52 | 56 | 59 | 53 | 43 | 44 | 48 |
| F [wtppm] | 0 | 0 | 0 | 0 | 0 | 0 | 0 |
| Other impurities [wt %] | 0.005 | 0.004 | 0.005 | 0.006 | 0.007 | 0.005 | 0.005 |
| Crystal structure | cubic | cubic | cubic | cubic | cubic | cubic | cubic |
| Density [g/cm³] | 3.696 | 3.681 | 3.695 | 3.679 | 3.699 | 3.688 | 3.688 |
| Average crystal grain size [μm] | 176.2 | 102 | 138 | 121 | 154 | 171 | 148.2 |
| Number of air bubbles of 1-5 μm [bubbles/mm³] | 20.3 | 12.1 | 234.6 | 2550.8 | 483.2 | 1309.5 | 2187.4 |
| Closed porosity [vol %] | 0.03 | 0.03 | 0.04 | 0.45 | 0.09 | 0.22 | 0.54 |
| Transmittance (t = 1.9 mm) [%] | 80.16 | 80.51 | 75.00 | 75.35 | 76.12 | 76.38 | 71.10 |
| Clarity (t = 1.9 mm) [%] | 76.73 | 77.73 | 73.47 | 61.23 | 66.28 | 67.01 | 61.78 |
| Haze (t = 1.9 mm) [%] | 3.8 | 1.8 | 4.5 | 5.8 | 6.3 | 3.7 | 5.8 |
| Reflectance [%] | 14.14 | 13.36 | 13.76 | 13.51 | 13.69 | 13.75 | 13.47 |
| Number of air microbubble clusters [clusters/mm³] | 3.6 | 2.3 | 12.6 | 10.8 | 17.3 | 0.2 | 30.7 |
| Thermal conductivity [W/m · K] | 12.19 | 12.01 | 12.12 | 11.57 | 11.99 | 11.91 | 11.38 |
| Bending strength after quenching [MPa] | 48.9 | 60.3 | 55.2 | 55.0 | 56.2 | 46.2 | 48.7 |
| Vickers hardness [GPa] | 14.92 | 14.84 | 14.58 | 14.49 | 14.87 | 14.70 | 14.45 |
| Three-point bending strength [MPa] | 345.6 | 320.6 | 341.0 | 292.6 | 314.6 | 303.6 | 260.7 |
| Transmittance (t = 0.8 mm) [%] | 82.84 | 83.42 | 81.13 | 80.62 | 81.33 | 81.73 | 78.46 |
| Clarity (t = 0.8 mm) [%] | 90.65 | 90.50 | 87.30 | 81.60 | 83.40 | 86.50 | 81.98 |
| Haze (t = 0.8 mm) [%] | 2.1 | 1.0 | 2.6 | 3.8 | 4.1 | 2.1 | 3.9 |
| Transmittance (t = 0.4 mm) [%] | 83.85 | 84.00 | 83.00 | 82.76 | 82.98 | 83.29 | 81.44 |
| Clarity (t = 0.4 mm) [%] | 94.2 | 94.3 | 91.4 | 87.2 | 89.4 | 91.9 | 87.0 |
| Haze (t = 0.4 mm) [%] | 0.7 | 0.3 | 0.9 | 1.7 | 2.4 | 0.7 | 1.6 |
| Intensity ratio of diffused lights (1.9 mm/1°) [%] | 1.88 | 1.87 | 2.34 | 3.34 | 3.10 | 3.14 | 3.24 |
| Intensity ratio of diffused lights (1.9 mm/2°) [%] | 0.14 | 0.12 | 0.19 | 0.24 | 0.24 | 0.23 | 0.25 |
| Intensity ratio of diffused lights (1.9 mm/3°) [%] | 0.05 | 0.04 | 0.08 | 0.09 | 0.09 | 0.09 | 0.11 |
| Intensity ratio of diffused lights (0.8 mm/1°) [%] | 1.32 | 1.29 | 1.78 | 3.12 | 1.79 | 1.63 | 1.90 |
| Intensity ratio of diffused lights (0.8 mm/2°) [%] | 0.09 | 0.08 | 0.12 | 0.19 | 0.13 | 0.13 | 0.18 |
| Intensity ratio of diffused lights (0.8 mm/3°) [%] | 0.03 | 0.03 | 0.04 | 0.06 | 0.04 | 0.04 | 0.06 |
| Intensity ratio of diffused lights (0.4 mm/1°) [%] | 0.84 | 0.78 | 1.03 | 1.52 | 1.16 | 0.96 | 1.12 |

As shown in Table 1, in the AlON sintered bodies of Examples 1 to 3, particularly, the number of air bubbles each having a pore size of 1 μm or more and less than 5 μm is small, the number of air microbubble clusters is also small, and therefore, the transmittance and clarity are high. Use of such an AlON sintered body as a transparent member makes the object present on the opposite side of the AlON sintered body as a transparent member be clearly visible. The AlON sintered body of Example 4 does not contain $Li_2O$, and the number of air bubbles each having a pore size of 1 μm or more and less than 5 μm is slightly larger than other Examples. From this, it is found to be effective for the AlON sintered body to contain $Li_2O$ as a sintering additive component.

Examples 8 to 11

Ceramic sintered bodies were manufactured in the same manner as in Example 1 except that in the production step of the ceramic sintered body of Example 1, the content ratio of $Al_2O_3$ and AlN was changed as shown in Table 2. The amounts of respective components (including the amount of impurities) of each ceramic sintered body, the number of air bubbles, respective physical property values, etc. were measured in the same manner as in Example 1. The results obtained are shown in Table 2.

TABLE 2

|  | Example 8 | Example 9 | Example 10 | Example 11 |
|---|---|---|---|---|
| $Al_2O_3$ [mol %] | 74 | 75 | 77 | 68 |
| AlN [mol %] | 26 | 25 | 23 | 32 |
| $Y_2O_3$ [wt %] | 0.081 | 0.086 | 0.088 | 0.088 |
| $Li_2O$ [wt %] | 0.044 | 0.028 | 0.034 | 0.026 |
| MgO [wt %] | 0.066 | 0.088 | 0.093 | 0.086 |
| MgO/$Li_2O$ Ratio | 1.50 | 3.14 | 2.74 | 2.74 |
| CaO [wt %] | 0 | 0 | 0 | 0 |
| $SiO_2$ [wt %] | 0 | 0 | 0 | 0 |
| $Na_2O$ [wt %] | 0 | 0 | 0 | 0 |
| $SnO_2$ [wt %] | 0 | 0 | 0 | 0 |
| $La_2O_3$ [wt %] | 0 | 0 | 0 | 0 |
| C [wtppm] | 46 | 88 | 48 | 44 |
| F [wtppm] | 0 | 0 | 0 | 0 |
| Other impurities [wt %] | 0.008 | 0.002 | 0.005 | 0.005 |
| Crystal structure | cubic | cubic | cubic | cubic |
| Density [g/$cm^3$] | 3.699 | 3.695 | 3.693 | 3.686 |
| Average crystal grain size [µm] | 186 | 149 | 129 | 135 |
| Number of air bubbles of 1-5 µm [bubbles/$mm^3$] | 492.5 | 1409.9 | 1349.1 | 1219.5 |
| Closed porosity [vol %] | 0.08 | 0.28 | 0.29 | 0.24 |
| Transmittance (t = 1.9 mm) [%] | 76.16 | 77.70 | 75.12 | 70.19 |
| Clarity (t = 1.9 mm) [%] | 68.88 | 71.20 | 68.43 | 61.53 |
| Haze (t = 1.9 mm) [%] | 4.0 | 4.2 | 4.7 | 5.7 |
| Reflectance [%] | 13.66 | 13.67 | 13.59 | 13.77 |
| Number of air microbubble clusters [clusters/$mm^3$] | 18.7 | 4.7 | 4.5 | 5.8 |
| Thermal conductivity [W/m · K] | 12.02 | 11.79 | 11.64 | 11.67 |
| Bending strength after quenching [MPa] | 53.4 | 59.1 | 61.2 | 58.3 |
| Vickers hardness [GPa] | 14.89 | 14.57 | 14.61 | 13.85 |
| Three-point bending strength [MPa] | 305.8 | 311.3 | 278.4 | 236.1 |
| Transmittance (t = 0.8 mm) [%] | 81.36 | 83.14 | 82.15 | 77.78 |
| Clarity (t = 0.8 mm) [%] | 86.00 | 87.20 | 84.18 | 81.61 |
| Haze (t = 0.8 mm) [%] | 2.7 | 3.0 | 3.2 | 3.8 |
| Transmittance (t = 0.4 mm) [%] | 83.11 | 84.02 | 82.15 | 81.09 |
| Clarity (t = 0.4 mm) [%] | 92.3 | 92.2 | 90.1 | 87.4 |
| Haze (t = 0.4 mm) [%] | 0.9 | 1.2 | 1.4 | 1.7 |
| Intensity ratio of diffused lights (1.9 mm/1°) [%] | 2.45 | 2.82 | 2.98 | 3.33 |
| Intensity ratio of diffused lights (1.9 mm/2°) [%] | 0.21 | 0.23 | 0.24 | 0.25 |
| Intensity ratio of diffused lights (1.9 mm/3°) [%] | 0.08 | 0.07 | 0.09 | 0.09 |
| Intensity ratio of diffused lights (0.8 mm/1°) [%] | 1.83 | 1.31 | 1.4 | 3.30 |
| Intensity ratio of diffused lights (0.8 mm/2°) [%] | 0.12 | 0.13 | 0.16 | 0.21 |
| Intensity ratio of diffused lights (0.8 mm/3°) [%] | 0.04 | 0.04 | 0.06 | 0.06 |
| Intensity ratio of diffused lights (0.4 mm/1°) [%] | 1.00 | 0.83 | 0.95 | 1.53 |

Example 12

A ceramic sintered body was manufactured in the same manner as in Example 5 except that in the production step of the ceramic sintered body of Example 5, the content of $Y_2O_3$ was increased as shown in Table 3. The amounts of respective components (including the amount of impurities) of the ceramic sintered body, the number of air bubbles, respective physical property values, etc. were measured in the same manner as in Example 1. The results obtained are shown in Table 3. It is seen that the AlON sintered body of Example 5 has the small number of air bubbles each having a pore size of 1 µm or more and less than 5 and the small number of air microbubble clusters, compared with Example 12, thereby having high transmittance and clarity.

Examples 13 and 14

Ceramic sintered bodies were manufactured in the same manner as in Example 5 except that in the production step of the ceramic sintered body of Example 5, the content of $MgO_3$ was increased as shown in Table 3. The amounts of respective components (including the amount of impurities) of each ceramic sintered body, the number of air bubbles, respective physical property values, etc. were measured in the same manner as in Example 1. The results obtained are shown in Table 3. It is seen that the AlON sintered body of Example 5 has the small number of air bubbles each having a pore size of 1 µm or more and less than 5 and the small number of air microbubble clusters, compared with Example 13 and Example 14, thereby having high transmittance and clarity.

Examples 15 to 17

Ceramic sintered bodies were manufactured in the same manner as in Example 1 except that in the production step of the ceramic sintered body of Example 1, at least one of $Na_2O$, $SiO_2$, $SnO_2$, and $La_2O_3$ was incorporated. The amounts of respective components (including the amount of impurities) of each ceramic sintered body, the number of air bubbles, respective physical property values, etc. were measured in the same manner as in Example 1. The results obtained are shown in Table 3 and Table 4. In the AlON sintered body of Example 15, particularly, the number of air bubbles each having a pore size of 1 μm or more and less than 5 μm is small, the number of air microbubble clusters is also small, and therefore, the transmittance and clarity are high.

Examples 18 and 19

Ceramic sintered bodies were manufactured in the same manner as in Example 4 except that in the production step of the ceramic sintered body of Example 4, CaO was incorporated. The amounts of respective components (including the amount of impurities) of each ceramic sintered body, the number of air bubbles, respective physical property values, etc. were measured in the same manner as in Example 1. The results obtained are shown in Table 4. In the AlON sintered body of Example 18, particularly, the number of air bubbles each having a pore size of 1 μm or more and less than 5 μm is small, the number of air microbubble clusters is also small, and therefore, the transmittance and clarity are high.

Example 20

A ceramic sintered body was manufactured in the same manner as in Example 3 except that in the production step of the ceramic sintered body of Example 3, the content of the carbon source was increased to increase the residual carbon amount. The amounts of respective components (including the amount of impurities) of the ceramic sintered body, the number of air bubbles, respective physical property values, etc. were measured in the same manner as in Example 1. The results obtained are shown in Table 4. It is seen that the AlON sintered body of Example 3 has the small number of air bubbles each having a pore size of 1 μm or more and less than 5 μm, compared with Example 20, thereby having high transmittance.

Example 21

First, an MgAlON powder having an average particle diameter of 400 nm, and a $Y_2O_3$ powder, a $Li_2CO_3$ powder, and a MgO powder each having an average particle diameter of 1.0 μm were prepared. 150 g of the MgAlON powder having a molar ratio of $Al_2O_3$:AlN:MgO=68.2:15.9:15.9 was weighed, and 0.05 mass % of $Y_2O_3$ powder, 0.14 mass % of $Li_2CO_3$ powder, and 0.10 mass % of MgO powder were weighed relative to the MgAlON powder (150 g). Furthermore, 1.5 g of a polycarboxylic acid-based polymer (produced by Chukyo Yushi Co., Ltd., trade name: Celuna D-305) was weighed as a carbon source, and respective materials were put in a polyurethane-made pot. These materials were mixed and pulverized for 96 hours in a rotary ball mill (manufactured by Aichi Electric Co., Ltd., trade name: AN-3S) using high-purity alumina balls of 5 mm in diameter and using 440 ml of anhydrous ethanol as the medium, and the obtained slurry was dried under reduced pressure to obtain a raw material powder. The average particle diameter of the obtained raw material powder was 0.25 μm.

Next, the obtained raw material powder was molded into a disk of 16 mm in diameter and 3 mm in thickness by using a dry single-shaft press and then isostatically pressed at a pressure of 2,000 kg/cm² by using a cold isotropic pressing machine (manufactured by NIKKISO Co., Ltd., trade name: CL15-28-20) to form a molded body. The obtained molded body was put in a carbon-made crucible and held at 1,650° C. for 3 hours under a vacuum atmosphere of 20 Pa in a carbon firing furnace to effect primary firing. After the atmosphere in the firing furnace was changed to a $N_2$ atmosphere at atmospheric pressure, the temperature was raised up to 1,875° C., and the molded body was held at that temperature for 24 hours to effect secondary firing and thereafter, cooled to room temperature to obtain a ceramic sintered body. The temperature rise rate during firing was 220° C./h up to 1,350° C. and 20° C./h at 1,350° C. or more. The cooling rate after firing was 100° C./h down to 1,000° C. and 20° C./h at 1,000° C. or less. The amounts of respective components (including the amount of impurities) of the thus-obtained ceramic sintered body, the number of air bubbles, respective physical property values, etc. were measured in the same manner as in Example 1. The results obtained are shown in Table 4.

TABLE 3

|  | Example 12 | Example 13 | Example 14 | Example 15 | Example 16 |
|---|---|---|---|---|---|
| $Al_2O_3$ [mol %] | 70 | 70 | 70 | 70 | 70 |
| AlN [mol %] | 30 | 30 | 30 | 30 | 30 |
| $Y_2O_3$ [wt %] | 0.134 | 0.091 | 0.076 | 0.087 | 0.095 |
| $Li_2O$ [wt %] | 0.058 | 0.053 | 0.062 | 0.034 | 0 |
| MgO [wt %] | 0.09 | 0.132 | 0.172 | 0 | 0.095 |
| MgO/$Li_2O$ Ratio | 1.55 | 2.49 | 2.77 | — | — |
| CaO [wt %] | 0 | 0 | 0 | 0 | 0 |
| $SiO_2$ [wt %] | 0 | 0 | 0 | 0.011 | 0.034 |
| $Na_2O$ [wt %] | 0 | 0 | 0 | 0.002 | 0.008 |
| $SnO_2$ [wt %] | 0 | 0 | 0 | 0 | 0.009 |
| $La_2O_3$ [wt %] | 0 | 0 | 0 | 0.02 | 0 |
| C [wtppm] | 55 | 50 | 52 | 44 | 47 |
| F [wtppm] | 0 | 0 | 0 | 0 | 0 |
| Other impurities [wt %] | 0.005 | 0.005 | 0.005 | 0.005 | 0.005 |
| Crystal structure | cubic | cubic | cubic | cubic | cubic |
| Density [g/cm³] | 3.666 | 3.686 | 3.686 | 3.691 | 3.687 |
| Average crystal grain size [μm] | 110.4 | 136.9 | 139.9 | 200.3 | 189.3 |
| Number of air bubbles of 1-5 μm [bubbles/mm³] | 2507.4 | 2200.6 | 2580 | 267.8 | 814.2 |
| Closed porosity [vol %] | 0.71 | 0.55 | 0.59 | 0.09 | 0.23 |
| Transmittance (t = 1.9 mm) [%] | 75.03 | 72.13 | 70.08 | 77.40 | 76.25 |
| Clarity (t = 1.9 mm) [%] | 61.0 | 60.5 | 60.3 | 69.12 | 66.74 |
| Haze (t = 1.9 mm) [%] | 6.8 | 6.9 | 5.5 | 4.3 | 4.8 |
| Reflectance [%] | 13.62 | 13.53 | 13.58 | 13.91 | 13.74 |

TABLE 3-continued

|  | Example 12 | Example 13 | Example 14 | Example 15 | Example 16 |
|---|---|---|---|---|---|
| Number of air microbubble clusters [clusters/mm³] | 33.6 | 36.1 | 22.1 | 4.9 | 8.2 |
| Thermal conductivity [W/m · K] | 11.40 | 11.46 | 11.38 | 12.11 | 11.84 |
| Bending strength after quenching [MPa] | 62.6 | 60.2 | 51.4 | 42.9 | 44.5 |
| Vickers hardness [GPa] | 14.54 | 14.53 | 13.73 | 14.89 | 14.82 |
| Three-point bending strength [MPa] | 242.7 | 247.8 | 238.4 | 318.6 | 304.8 |
| Transmittance (t = 0.8 mm) [%] | 80.47 | 78.81 | 74.30 | 82.75 | 81.43 |
| Clarity (t = 0.8 mm) [%] | 80.66 | 80.03 | 80.04 | 84.78 | 86.39 |
| Haze (t = 0.8 mm) [%] | 4.6 | 4.7 | 3.7 | 3.1 | 3.4 |
| Transmittance (t = 0.4 mm) [%] | 82.26 | 81.88 | 78.96 | 83.02 | 82.96 |
| Clarity (t = 0.4 mm) [%] | 80.66 | 80.66 | 80.68 | 90.59 | 90.66 |
| Haze (t = 0.4 mm) [%] | 2.6 | 2.6 | 1.6 | 1.3 | 1.5 |
| Intensity ratio of diffused lights (1.9 mm/1°) [%] | 3.20 | 3.28 | 3.31 | 2.88 | 3.00 |
| Intensity ratio of diffused lights (1.9 mm/2°) [%] | 0.24 | 0.26 | 0.27 | 0.25 | 0.25 |
| Intensity ratio of diffused lights (1.9 mm/3°) [%] | 0.10 | 0.11 | 0.12 | 0.08 | 0.10 |
| Intensity ratio of diffused lights (0.8 mm/1°) [%] | 1.88 | 1.93 | 1.92 | 1.35 | 1.42 |
| Intensity ratio of diffused lights (0.8 mm/2°) [%] | 0.17 | 0.18 | 0.18 | 0.14 | 0.17 |
| Intensity ratio of diffused lights (0.8 mm/3°) [%] | 0.05 | 0.06 | 0.06 | 0.05 | 0.07 |
| Intensity ratio of diffused lights (0.4 mm/1°) [%] | 1.10 | 1.12 | 1.11 | 0.86 | 0.97 |

TABLE 4

|  | Example 17 | Example 18 | Example 19 | Example 20 | Example 21 |
|---|---|---|---|---|---|
| $Al_2O_3$ [mol %] | 70 | 70 | 70 | 70 | 81.1 |
| AlN [mol %] | 30 | 30 | 30 | 30 | 18.9 |
| $Y_2O_3$ [wt %] | 0.112 | 0.076 | 0.087 | 0.079 | 0.044 |
| $Li_2O$ [wt %] | 0.011 | 0 | 0 | 0.017 | 0.05 |
| MgO [wt %] | 0.032 | 0.098 | 0.099 | 0.068 | 8.45 |
| MgO/$Li_2O$ Ratio | 2.91 | — | — | 4.00 | 169.0 |
| CaO [wt %] | 0 | 0.021 | 0.136 | 0 | 0 |
| $SiO_2$ [wt %] | 0.005 | 0 | 0 | 0 | 0 |
| $Na_2O$ [wt %] | 0 | 0 | 0 | 0 | 0 |
| $SnO_2$ [wt %] | 0 | 0 | 0 | 0 | 0 |
| $La_2O_3$ [wt %] | 0.103 | 0 | 0 | 0 | 0 |
| C [wtppm] | 48 | 81 | 54 | 164.3 | 52 |
| F [wtppm] | 0 | 0 | 0 | 0 | 0 |
| Other impurities [wt %] | 0.005 | 0.004 | 0.004 | 0.006 | 0.005 |
| Crystal structure | cubic | cubic | cubic | cubic | cubic |
| Density [g/cm³] | 3.686 | 3.696 | 3.686 | 3.669 | 3.611 |
| Average crystal grain size [μm] | 100.1 | 167.0 | 141.5 | 140.3 | 99.8 |
| Number of air bubbles of 1-5 μm [bubbles/mm³] | 2894.1 | 980.4 | 1210.7 | 3105.2 | 774.9 |
| Closed porosity [vol %] | 0.61 | 0.17 | 0.25 | 0.58 | 0.44 |
| Transmittance (t = 1.9 mm) [%] | 75.71 | 76.65 | 72.15 | 70.40 | 77.45 |
| Clarity (t = 1.9 mm) [%] | 61.50 | 71.35 | 67.55 | 68.23 | 72.14 |
| Haze (t = 1.9 mm) [%] | 6.6 | 4.3 | 4.8 | 6.5 | 5.9 |
| Reflectance [%] | 13.56 | 13.68 | 13.66 | 13.53 | 13.47 |
| Number of air microbubble clusters [clusters/mm³] | 32.1 | 2.3 | 13.2 | 12.3 | 13.2 |
| Thermal conductivity [W/m · K] | 11.45 | 11.93 | 11.85 | 11.47 | 7.83 |
| Bending strength after quenching [MPa] | 54.6 | 55.2 | 52.7 | 51.6 | 44.3 |
| Vickers hardness [GPa] | 14.29 | 14.74 | 14.56 | 14.46 | 13.90 |
| Three-point bending strength [MPa] | 236.7 | 303.6 | 267.3 | 253.1 | 313.1 |
| Transmittance (t = 0.8 mm) [%] | 81.08 | 82.02 | 77.88 | 76.27 | 82.07 |
| Clarity (t = 0.8 mm) [%] | 80.70 | 87.70 | 82.69 | 84.37 | 87.15 |
| Haze (t = 0.8 mm) [%] | 4.4 | 3.1 | 3.4 | 4.2 | 3.9 |
| Transmittance (t = 0.4 mm) [%] | 82.73 | 83.40 | 80.89 | 80.87 | 83.40 |
| Clarity (t = 0.4 mm) [%] | 88.70 | 92.50 | 89.40 | 90.16 | 91.30 |
| Haze (t = 0.4 mm) [%] | 2.6 | 1.3 | 1.7 | 2.5 | 2.0 |
| Intensity ratio of diffused lights (1.9 mm/1°) [%] | 3.26 | 2.78 | 2.81 | 3.05 | 2.46 |
| Intensity ratio of diffused lights (1.9 mm/2°) [%] | 0.25 | 0.22 | 0.24 | 0.27 | 0.22 |
| Intensity ratio of diffused lights (1.9 mm/3°) [%] | 0.10 | 0.07 | 0.09 | 0.11 | 0.08 |
| Intensity ratio of diffused lights (0.8 mm/1°) [%] | 1.86 | 1.74 | 1.78 | 1.43 | 1.76 |

TABLE 4-continued

|  | Example 17 | Example 18 | Example 19 | Example 20 | Example 21 |
|---|---|---|---|---|---|
| Intensity ratio of diffused lights (0.8 mm/2°) [%] | 0.16 | 0.12 | 0.14 | 0.18 | 0.15 |
| Intensity ratio of diffused lights (0.8 mm/3°) [%] | 0.05 | 0.03 | 0.05 | 0.07 | 0.05 |
| Intensity ratio of diffused lights (0.4 mm/1°) [%] | 1.09 | 0.99 | 1.02 | 0.97 | 0.93 |

Examples 22 and 23

Ceramic sintered bodies were manufactured in the same manner as in Example 1 except that in the production step of the ceramic sintered body of Example 1, the primary firing temperature was changed to 1,600° C. (Example 22) and 1,700° C. (Example 23). The amounts of respective components (including the amount of impurities) of each ceramic sintered body, the number of air bubbles, respective physical property values, etc. were measured in the same manner as in Example 1. The results obtained are shown in Table 5. It is seen that the AlON sintered body of Example 1 has the small number of air bubbles each having a pore size of 1 µm or more and less than 5 µm and the small number of air microbubble clusters, compared with Example 22 and Example 23, thereby having high transmittance and clarity.

Example 24

A ceramic sintered body was manufactured in the same manner as in Example 4 except that in the production step of the ceramic sintered body of Example 4, the primary firing atmosphere was changed to an $N_2$ atmosphere at atmospheric pressure. The amounts of respective components (including the amount of impurities) of the ceramic sintered body, the number of air bubbles, respective physical property values, etc. were measured in the same manner as in Example 1. The results obtained are shown in Table 5. In the case of not containing $Li_2O$ as a sintering additive, the primary firing atmosphere is preferably set at an atmospheric pressure, and it is seen that the AlON sintered body of Example 24 has the small number of air bubbles each having a pore size of 1 µm or more and less than 5 µm and the small number of air microbubble clusters, compared with Example 4, thereby having high transmittance and clarity.

Example 25

A ceramic sintered body was manufactured in the same manner as in Example 1 except that in the production step of the ceramic sintered body of Example 1, $Mg(NO_3)_2$ was used as the MgO source. The amounts of respective components (including the amount of impurities) of the ceramic sintered body, the number of air bubbles, respective physical property values, etc. were measured in the same manner as in Example 1. The results obtained are shown in Table 5. It is seen that the AlON sintered body of Example 1 has the small number of air bubbles each having a pore size of 1 µm or more and less than 5 µm and the small number of air microbubble clusters, compared with Example 25, thereby having high transmittance and clarity.

Example 26

A ceramic sintered body was manufactured in the same manner as in Example 1 except that in the production step of the ceramic sintered body of Example 1, 0.09 mass % of MgO and $Mg(NO_3)_2$ corresponding to 0.06 mass % were used as the MgO source. The amounts of respective components (including the amount of impurities) of the ceramic sintered body, the number of air bubbles, respective physical property values, etc. were measured in the same manner as in Example 1. The results obtained are shown in Table 5. It is seen that the AlON sintered body of Example 26 has the small number of air bubbles each having a pore size of 1 µm or more and less than 5 µm and the small number of air microbubble clusters, compared with Example 1, thereby having high transmittance and clarity.

Example 27

A ceramic sintered body was manufactured in the same manner as in Example 1 except that in the production step of the ceramic sintered body of Example 1, the shape of the molded body was changed to a disk of 90 mm in diameter and 15 mm in thickness. The amounts of respective components (including the amount of impurities) of the ceramic sintered body, the number of air bubbles, respective physical property values, etc. were measured in the same manner as in Example 1. The results obtained are shown in Table 5. In the AlON sintered body of Example 1, the number of air bubbles each having a pore size of 1 µm or more and less than 5 µm is small, and the number of air microbubble clusters is also small, but it is seen that also the AlON sintered body of Example 27 has the transmittance and clarity required of a transparent member.

TABLE 5

|  | Example 22 | Example 23 | Example 24 | Example 25 | Example 26 | Example 27 |
|---|---|---|---|---|---|---|
| $Al_2O_3$ [mol %] | 70 | 70 | 70 | 70 | 70 | 74 |
| AlN [mol %] | 30 | 30 | 30 | 30 | 30 | 26 |
| $Y_2O_3$ [wt %] | 0.074 | 0.078 | 0.096 | 0.067 | 0.085 | 0.076 |
| $Li_2O$ [wt %] | 0.018 | 0.025 | 0 | 0.039 | 0.042 | 0.052 |
| MgO [wt %] | 0.099 | 0.078 | 0.091 | 0.078 | 0.088 | 0.072 |
| MgO/$Li_2O$ Ratio | 5.50 | 3.12 | — | 2.79 | 3.83 | 1.38 |
| CaO [wt %] | 0 | 0 | 0 | 0 | 0 | 0 |
| $SiO_2$ [wt %] | 0 | 0 | 0 | 0 | 0 | 0 |
| $Na_2O$ [wt %] | 0 | 0 | 0 | 0 | 0 | 0 |
| $SnO_2$ [wt %] | 0 | 0 | 0 | 0 | 0 | 0 |

TABLE 5-continued

|  | Example 22 | Example 23 | Example 24 | Example 25 | Example 26 | Example 27 |
|---|---|---|---|---|---|---|
| $La_2O_3$ [wt %] | 0 | 0 | 0 | 0 | 0 | 0 |
| C [wtppm] | 50 | 47 | 51 | 50 | 51 | 44 |
| F [wtppm] | 0 | 0 | 0 | 0 | 0 | 0 |
| Other impurities [wt %] | 0.005 | 0.005 | 0.01 | 0.005 | 0.005 | 0.006 |
| Crystal structure | cubic | cubic | cubic | cubic | cubic | cubic |
| Density [g/cm$^3$] | 3.657 | 3.685 | 3.683 | 3.675 | 3.696 | 3.687 |
| Average crystal grain size [μm] | 89.3 | 139.2 | 202.0 | 167.0 | 167.3 | 130.2 |
| Number of air bubbles of 1-5 μm [bubbles/mm$^3$] | 2530.8 | 2798.4 | 2073.6 | 3036.4 | 195.2 | 2209.4 |
| Closed porosity [vol %] | 1.01 | 0.56 | 0.36 | 0.56 | 0.03 | 0.41 |
| Transmittance (t = 1.9 mm) [%] | 70.32 | 73.29 | 76.60 | 70.08 | 80.13 | 70.88 |
| Clarity (t = 1.9 mm) [%] | 62.02 | 62.10 | 65.57 | 60.11 | 80.05 | 62.30 |
| Haze (t = 1.9 mm) [%] | 6.9 | 6.8 | 6.8 | 7.0 | 3.9 | 5.5 |
| Reflectance [%] | 13.48 | 13.50 | 13.69 | 13.11 | 13.97 | 13.49 |
| Number of air microbubble clusters [clusters/mm$^3$] | 29.6 | 32.2 | 9.8 | 10.1 | 0.0 | 33.1 |
| Thermal conductivity [W/m · K] | 11.41 | 11.39 | 11.69 | 11.45 | 12.10 | 11.52 |
| Bending strength after quenching [MPa] | 57.4 | 54.1 | 55.0 | 54.5 | 50.7 | 53.8 |
| Vickers hardness [GPa] | 14.73 | 14.02 | 14.51 | 14.48 | 15.05 | 14.60 |
| Three-point bending strength [MPa] | 242.7 | 235.4 | 271.7 | 288.2 | 330.7 | 270.5 |
| Transmittance (t = 0.8 mm) [%] | 76.09 | 78.32 | 81.96 | 77.69 | 82.79 | 76.84 |
| Clarity (t = 0.8 mm) [%] | 78.80 | 79.44 | 84.80 | 80.80 | 93.11 | 82.74 |
| Haze (t = 0.8 mm) [%] | 4.8 | 4.6 | 4.3 | 5.9 | 2.1 | 3.5 |
| Transmittance (t = 0.4 mm) [%] | 80.07 | 81.51 | 83.41 | 80.17 | 83.81 | 80.49 |
| Clarity (t = 0.4 mm) [%] | 80.34 | 80.68 | 89.50 | 85.60 | 94.80 | 89.50 |
| Haze (t = 0.4 mm) [%] | 2.7 | 2.6 | 2.2 | 4.4 | 0.9 | 1.8 |
| Intensity ratio of diffused lights (1.9 mm/1°) [%] | 3.32 | 3.33 | 2.82 | 2.81 | 1.95 | 3.18 |
| Intensity ratio of diffused lights (1.9 mm/2°) [%] | 0.25 | 0.28 | 0.23 | 0.23 | 0.16 | 0.22 |
| Intensity ratio of diffused lights (1.9 mm/3°) [%] | 0.12 | 0.11 | 0.08 | 0.09 | 0.06 | 0.09 |
| Intensity ratio of diffused lights (0.8 mm/1°) [%] | 1.97 | 1.88 | 2.00 | 1.89 | 1.34 | 1.83 |
| Intensity ratio of diffused lights (0.8 mm/2°) [%] | 0.19 | 0.17 | 0.19 | 0.27 | 0.08 | 0.14 |
| Intensity ratio of diffused lights (0.8 mm/3°) [%] | 0.07 | 0.06 | 0.05 | 0.07 | 0.03 | 0.04 |
| Intensity ratio of diffused lights (0.4 mm/1°) [%] | 1.14 | 1.10 | 1.08 | 1.22 | 0.88 | 1.04 |

Examples 28 and 29

Ceramic sintered bodies were manufactured in the same manner as in Example 1 except that in the production step of the ceramic sintered body of Example 1, the content ratio of $Al_2O_3$ and MN was changed as shown in Table 6. The amounts of respective components (including the amount of impurities) of each ceramic sintered body, the number of air bubbles, respective physical property values, etc. were measured in the same manner as in Example 1. The results obtained are shown in Table 6. In the AlON sintered body of Example 28, the number of air bubbles each having a pore size of 1 μm or more and less than 5 μm is large, the number of air microbubble clusters is also large, and therefore, the transmittance and clarity are low. In the AlON sintered body of Example 29, the clarity is low.

Examples 30 and 31

Ceramic sintered bodies were manufactured in the same manner as in Example 1 except that in the production step of the ceramic sintered body of Example 1, the content of $Li_2O_3$ was increased as shown in Table 6. Incidentally, in Example 31, the primary sintering step was conducted in a $N_2$ atmosphere at atmospheric pressure. The amounts of respective components (including the amount of impurities) of each ceramic sintered body, the number of air bubbles, respective physical property values, etc. were measured in the same manner as in Example 1. The results obtained are shown in Table 5. In the AlON sintered bodies of Examples 30 and 31, the number of air bubbles each having a pore size of 1 μm or more and less than 5 μm is large and therefore, the transmittance and clarity are low.

Examples 32 and 33

Ceramic sintered bodies were manufactured in the same manner as in Example 5 except that in the production step of the ceramic sintered body of Example 5, the content of $Y_2O_3$ was increased or decreased as shown in Table 6. Incidentally, in Example 32, the content of $Y_2O_3$ was made excessively large, and in Example 33, the content of $Y_2O_3$ was made excessively small. The amounts of respective components (including the amount of impurities) of each ceramic sintered body, the number of air bubbles, respective physical property values, etc. were measured in the same manner as in Example 1. The results obtained are shown in Table 6. In the AlON sintered bodies of Examples 32 and 33, the number of air bubbles each having a pore size of 1 μm or more and less than 5 μm is large, the number of air microbubble clusters is also large, and therefore, the transmittance and clarity are low.

TABLE 6

|  | Example 28 | Example 29 | Example 30 | Example 31 | Example 32 | Example 33 |
|---|---|---|---|---|---|---|
| $Al_2O_3$ [mol %] | 65 | 80 | 70 | 70 | 70 | 70 |
| AlN [mol %] | 35 | 20 | 30 | 30 | 30 | 30 |
| $Y_2O_3$ [wt %] | 0.078 | 0.085 | 0.072 | 0.076 | 0.223 | 0.017 |
| $Li_2O$ [wt %] | 0.038 | 0.035 | 0.209 | 0.208 | 0.046 | 0.047 |
| MgO [wt %] | 0.078 | 0.096 | 0.067 | 0.089 | 0.098 | 0.096 |
| MgO/$Li_2O$ Ratio | 2.05 | 2.74 | 0.61 | 0.82 | 2.13 | 2.04 |
| CaO [wt %] | 0 | 0 | 0 | 0 | 0 | 0 |
| $SiO_2$ [wt %] | 0 | 0 | 0 | 0 | 0 | 0 |
| $Na_2O$ [wt %] | 0 | 0 | 0 | 0 | 0 | 0 |
| $SnO_2$ [wt %] | 0 | 0 | 0 | 0 | 0 | 0 |
| $La_2O_3$ [wt %] | 0 | 0 | 0 | 0 | 0 | 0 |
| C [wtppm] | 43 | 35 | 41 | 38 | 42 | 59 |
| F [wtppm] | 0 | 0 | 0 | 0 | 0 | 0 |
| Other impurities [wt %] | 0.005 | 0.005 | 0.007 | 0.008 | 0.005 | 0.005 |
| Crystal structure | cubic | cubic | cubic | cubic | cubic | cubic |
| Density [g/cm$^3$] | 3.651 | 3.679 | 3.656 | 3.642 | 3.642 | 3.613 |
| Average crystal grain size [μm] | 102 | 142 | 240 | 198 | 130 | 87.4 |
| Number of air bubbles of 1-5 μm [bubbles/mm$^3$] | 5531.6 | 2846.5 | 5025.4 | 6235.5 | 3324.8 | 7693.4 |
| Closed porosity [vol %] | 0.78 | 0.76 | 1.08 | 1.46 | 1.43 | 1.55 |
| Transmittance (t = 1.9 mm) [%] | 36.13 | 71.67 | 57.55 | 68.78 | 51.10 | 33.08 |
| Clarity (t = 1.9 mm) [%] | 40.6 | 50.1 | 76.1 | 64.2 | 52.1 | 30.6 |
| Haze (t = 1.9 mm) [%] | 11.7 | 9.1 | 20.6 | 19.2 | 10.1 | 11.1 |
| Reflectance [%] | 13.79 | 13.44 | 12.66 | 12.73 | 13.45 | 11.74 |
| Number of air microbubble clusters [clusters/mm$^3$] | 42.3 | 31.2 | 14.0 | 21.0 | 41.0 | 42.2 |
| Thermal conductivity [W/m · K] | 11.51 | 11.33 | 10.92 | 10.54 | 11.47 | 9.89 |
| Bending strength after quenching [MPa] | 55.4 | 46.8 | 41.0 | 43.6 | 55.2 | 52.2 |
| Vickers hardness [GPa] | 14.02 | 14.21 | 14.54 | 14.41 | 14.38 | 13.89 |
| Three-point bending strength [MPa] | 232.1 | 260.7 | 242.0 | 217.8 | 231.9 | 191.2 |
| Transmittance (t = 0.8 mm) [%] | 59.42 | 78.44 | 70.14 | 74.93 | 67.17 | 57.91 |
| Clarity (t = 0.8 mm) [%] | 71.40 | 73.12 | 88.70 | 83.30 | 74.52 | 60.12 |
| Haze (t = 0.8 mm) [%] | 7.4 | 4.7 | 8.7 | 8.9 | 6.9 | 7.2 |
| Transmittance (t = 0.4 mm) [%] | 72.76 | 80.99 | 76.05 | 79.55 | 75.19 | 70.84 |
| Clarity (t = 0.4 mm) [%] | 74.90 | 77.27 | 93.70 | 89.90 | 75.87 | 65.31 |
| Haze (t = 0.4 mm) [%] | 5.0 | 2.6 | 4.9 | 5.2 | 5.4 | 5.2 |
| Intensity ratio of diffused lights (1.9 mm/1°) [%] | 7.25 | 5.57 | 2.35 | 3.81 | 5.34 | 6.33 |
| Intensity ratio of diffused lights (1.9 mm/2°) [%] | 0.64 | 0.59 | 0.22 | 0.52 | 0.56 | 0.76 |
| Intensity ratio of diffused lights (1.9 mm/3°) [%] | 0.14 | 0.14 | 0.08 | 0.18 | 0.12 | 0.17 |
| Intensity ratio of diffused lights (0.8 mm/1°) [%] | 3.42 | 3.01 | 1.31 | 2.33 | 2.67 | 3.13 |
| Intensity ratio of diffused lights (0.8 mm/2°) [%] | 0.27 | 0.18 | 0.11 | 0.25 | 0.15 | 0.30 |
| Intensity ratio of diffused lights (0.8 mm/3°) [%] | 0.12 | 0.06 | 0.03 | 0.09 | 0.04 | 0.08 |
| Intensity ratio of diffused lights (0.4 mm/1°) [%] | 1.83 | 1.56 | 0.98 | 1.04 | 1.49 | 1.49 |

Example 34

A ceramic sintered body was manufactured in the same manner as in Example 4 except that in the production step of the ceramic sintered body of Example 5, the content of MgO was increased as shown in Table 7. Incidentally, in Example 34, the content of MgO was made excessively large. The amounts of respective components (including the amount of impurities) of the ceramic sintered body, the number of air bubbles, respective physical property values, etc. were measured in the same manner as in Example 1. The results obtained are shown in Table 7. In the AlON sintered body of Example 34, the number of air bubbles each having a pore size of 1 μm or more and less than 5 μm is large, the number of air microbubble clusters is also large, and therefore, the transmittance and clarity are low.

Example 35

A ceramic sintered body was manufactured in the same manner as in Example 17 except that in the production step of the ceramic sintered body of Example 17, the content of $La_2O_3$ was increased as shown in Table 7. Incidentally, in Example 35, the content of $La_2O_3$ was made excessively large. The amounts of respective components (including the amount of impurities) of the ceramic sintered body, the number of air bubbles, respective physical property values, etc. were measured in the same manner as in Example 1. The results obtained are shown in Table 7. In the AlON sintered body of Example 35, the number of air bubbles each having a pore size of 1 μm or more and less than 5 μm is large and therefore, the transmittance and clarity are low.

Example 36

A ceramic sintered body was manufactured in the same manner as in Example 5 except that in the production step of the ceramic sintered body of Example 5, the content of carbon was decreased as shown in Table 7 and an AlN crucible was used at the time of firing. The amounts of respective components (including the amount of impurities) of the ceramic sintered body, the number of air bubbles, respective physical property values, etc. were measured in the same manner as in Example 1. The results obtained are shown in Table 7. In the AlON sintered body of Example 36, the number of air microbubble clusters is large and therefore, the clarity is low.

Examples 37 and 38

Ceramic sintered bodies were manufactured in the same manner as in Example 5 except that in the production step of the ceramic sintered body of Example 5, the content of carbon was increased as shown in Table 7. The amounts of respective components (including the amount of impurities) of each ceramic sintered body, the number of air bubbles, respective physical property values, etc. were measured in the same manner as in Example 1. The results obtained are shown in Table 7. In the AlON sintered bodies of Examples 37 and 38, the number of air bubbles each having a pore size of 1 μm or more and less than 5 μm is large, the number of air microbubble clusters is also large, and therefore, the transmittance and clarity are low.

Example 39

A ceramic sintered body was manufactured in the same manner as in Example 10 except that in the production step of the ceramic sintered body of Example 10, the content of carbon was increased as shown in Table 7. The amounts of respective components (including the amount of impurities) of the ceramic sintered body, the number of air bubbles, respective physical property values, etc. were measured in the same manner as in Example 1. The results obtained are shown in Table 7. In the AlON sintered body of Example 39, the number of air bubbles each having a pore size of 1 μm or more and less than 5 μm is large and therefore, the transmittance is low.

TABLE 7

|  | Example 34 | Example 35 | Example 36 | Example 37 | Example 38 | Example 39 |
|---|---|---|---|---|---|---|
| $Al_2O_3$ [mol %] | 70 | 70 | 70 | 70 | 70 | 77 |
| AlN [mol %] | 30 | 30 | 30 | 30 | 30 | 23 |
| $Y_2O_3$ [wt %] | 0.082 | 0.089 | 0.070 | 0.68 | 0.74 | 0.066 |
| $Li_2O$ [wt %] | 0.057 | 0.02 | 0.053 | 0.036 | 0.023 | 0.009 |
| MgO [wt %] | 0.248 | 0.035 | 0.088 | 0.91 | 0.084 | 0.078 |
| $MgO/Li_2O$ Ratio | 4.35 | 1.75 | 1.85 | 3.03 | 3.65 | 32.50 |
| CaO [wt %] | 0 | 0 | 0 | 0 | 0 | 0 |
| $SiO_2$ [wt %] | 0 | 0 | 0 | 0 | 0 | 0 |
| $Na_2O$ [wt %] | 0 | 0 | 0 | 0 | 0 | 0 |
| $SnO_2$ [wt %] | 0 | 0 | 0 | 0 | 0 | 0 |
| $La_2O_3$ [wt %] | 0 | 0.189 | 0 | 0 | 0 | 0 |
| C [wtppm] | 51 | 51 | 11 | 268 | 331 | 277 |
| F [wtppm] | 0 | 0 | 0 | 0 | 0 | 0 |
| Other impurities [wt %] | 0.004 | 0.005 | 0.006 | 0.004 | 0.004 | 0.005 |
| Crystal structure | cubic | cubic | cubic | cubic | cubic | cubic |
| Density [g/cm$^3$] | 3.645 | 3.653 | 3.677 | 3.602 | 3.601 | 3.641 |
| Average crystal grain size [μm] | 132.0 | 130.2 | 129.0 | 108.0 | 120.8 | 138.3 |
| Number of air bubbles of 1-5 μm [bubbles/mm$^3$] | 3241.2 | 4121.7 | 3006.5 | 8745.6 | 10032.3 | 7346.3 |
| Closed porosity [vol %] | 1.46 | 1.05 | 0.52 | 1.89 | 1.94 | 1.43 |
| Transmittance (t = 1.9 mm) [%] | 45.12 | 62.12 | 78.27 | 65.30 | 58.30 | 62.45 |
| Clarity (t = 1.9 mm) [%] | 35.1 | 85.1 | 36.5 | 47.8 | 60.8 | 73.9 |
| Haze (t = 1.9 mm) [%] | 12.7 | 13.2 | 5.3 | 10.1 | 9.9 | 7.6 |
| Reflectance [%] | 13.43 | 13.17 | 13.75 | 11.02 | 10.43 | 12.76 |
| Number of air microbubble clusters [clusters/mm$^3$] | 42.0 | 20.6 | 49.2 | 37.6 | 33.2 | 24.0 |
| Thermal conductivity [W/m · K] | 10.99 | 10.81 | 11.63 | 10.35 | 9.85 | 10.58 |
| Bending strength after quenching [MPa] | 58.6 | 57.0 | 55.5 | 48.3 | 49.6 | 45.5 |
| Vickers hardness [GPa] | 14.35 | 14.24 | 14.46 | 13.77 | 13.60 | 14.49 |
| Three-point bending strength [MPa] | 220.6 | 230.0 | 254.1 | 200.2 | 199.1 | 220.6 |
| Transmittance (t = 0.8 mm) [%] | 62.99 | 77.02 | 81.65 | 77.65 | 71.12 | 74.32 |
| Clarity (t = 0.8 mm) [%] | 59.48 | 74.20 | 63.00 | 73.79 | 76.91 | 87.32 |
| Haze (t = 0.8 mm) [%] | 7.8 | 8.2 | 3.3 | 6.6 | 6.5 | 6.3 |
| Transmittance (t = 0.4 mm) [%] | 73.62 | 78.94 | 83.28 | 81.66 | 77.24 | 79.15 |
| Clarity (t = 0.4 mm) [%] | 65.12 | 82.50 | 68.90 | 77.92 | 82.72 | 91.45 |
| Haze (t = 0.4 mm) [%] | 5.8 | 6.0 | 1.5 | 4.5 | 4.4 | 4.6 |
| Intensity ratio of diffused lights (1.9 mm/1°) [%] | 8.12 | 7.07 | 5.77 | 6.12 | 6.68 | 2.29 |
| Intensity ratio of diffused lights (1.9 mm/2°) [%] | 0.83 | 0.83 | 0.64 | 0.72 | 0.74 | 0.17 |
| Intensity ratio of diffused lights (1.9 mm/3°) [%] | 0.24 | 0.20 | 0.14 | 0.15 | 0.10 | 0.07 |
| Intensity ratio of diffused lights (0.8 mm/1°) [%] | 4.31 | 3.26 | 2.83 | 3.10 | 9.13 | 1.75 |
| Intensity ratio of diffused lights (0.8 mm/2°) [%] | 0.40 | 0.35 | 0.15 | 0.20 | 0.33 | 0.11 |
| Intensity ratio of diffused lights (0.8 mm/3°) [%] | 0.14 | 0.10 | 0.04 | 0.06 | 0.08 | 0.04 |
| Intensity ratio of diffused lights (0.4 mm/1°) [%] | 1.93 | 1.72 | 1.53 | 1.54 | 1.69 | 1.01 |

Example 40

A ceramic sintered body was manufactured in the same manner as in Example 1 except that in the production step of the ceramic sintered body of Example 1, the primary firing temperature was changed to 1,570° C. The amounts of respective components (including the amount of impurities) of the ceramic sintered body, the number of air bubbles, respective physical property values, etc. were measured in the same manner as in Example 1. The results obtained are shown in Table 8. In the AlON sintered body of Example 40, the number of air bubbles each having a pore size of 1 μm or more and less than 5 μm is very large and therefore, the transmittance and clarity are low.

Example 41

A ceramic sintered body was manufactured in the same manner as in Example 1 except that in the production step of the ceramic sintered body of Example 1, the secondary firing temperature was changed to 1,850° C. The amounts of respective components (including the amount of impurities) of the ceramic sintered body, the number of air bubbles, respective physical property values, etc. were measured in the same manner as in Example 1. The results obtained are shown in Table 8. In the AlON sintered body of Example 41, the number of air bubbles each having a pore size of 1 μm or more and less than 5 μm is large, the number of air microbubble clusters is also large, and therefore, the transmittance and clarity are low.

Example 42

A ceramic sintered body was manufactured in the same manner as in Example 4 except that in the production step of the ceramic sintered body of Example 4, the content of carbon was decreased, the mixing•pulverization time of the raw material powder in a ball mill was changed to 48 hours, and an AlN crucible was used at the time of firing. The amounts of respective components (including the amount of impurities) of the ceramic sintered body, the number of air bubbles, respective physical property values, etc. were measured in the same manner as in Example 1. The results obtained are shown in Table 8. In the AlON sintered body of Example 42, the number of air microbubble clusters is large and therefore, the clarity is low.

Example 43

A ceramic sintered body was manufactured in the same manner as in Example 4 except that in the production step of the ceramic sintered body of Example 4, the content ratio of $Al_2O_3$ and AlN was changed as shown in Table 8 and the mixing•pulverization time of the raw material powder in a ball mill was changed to 48 hours. The amounts of respective components (including the amount of impurities) of the ceramic sintered body, the number of air bubbles, respective physical property values, etc. were measured in the same manner as in Example 1. The results obtained are shown in Table 8. In the AlON sintered body of Example 43, the clarity is low.

Example 44

A ceramic sintered body was manufactured in the same manner as in Example 43 except that in the production step of the ceramic sintered body of Example 43, the content of carbon was decreased and an AlN crucible was used at the time of firing. The amounts of respective components (including the amount of impurities) of the ceramic sintered body, the number of air bubbles, respective physical property values, etc. were measured in the same manner as in Example 1. The results obtained are shown in Table 8. In the AlON sintered body of Example 44, the clarity is low.

TABLE 8

| | Example 40 | Example 41 | Example 42 | Example 43 | Example 44 |
|---|---|---|---|---|---|
| $Al_2O_3$ [mol %] | 70 | 70 | 70 | 80 | 80 |
| AlN [mol %] | 30 | 30 | 30 | 20 | 20 |
| $Y_2O_3$ [wt %] | 0.081 | 0.077 | 0.77 | 0.076 | 0.078 |
| $Li_2O$ [wt %] | 0.064 | 0.049 | 0 | 0 | 0 |
| MgO [wt %] | 0.076 | 0.071 | 0.960 | 0.141 | 0.139 |
| MgO/$Li_2O$ Ratio | 1.19 | 1.45 | — | — | — |
| CaO [wt %] | 0 | 0 | 0 | 0 | 0 |
| $SiO_2$ [wt %] | 0 | 0 | 0 | 0 | 0 |
| $Na_2O$ [wt %] | 0 | 0 | 0 | 0 | 0 |
| $SnO_2$ [wt %] | 0 | 0 | 0 | 0 | 0 |
| $La_2O_3$ [wt %] | 0 | 0 | 0 | 0 | 0 |
| C [wtppm] | 52 | 50 | 9 | 34 | 8 |
| F [wtppm] | 0 | 0 | 0 | 0 | 0 |
| Other impurities [wt %] | 0.005 | 0.005 | 0.004 | 0.004 | 0.004 |
| Crystal structure | cubic | cubic | cubic | cubic | cubic |
| Density [g/cm$^3$] | 3.588 | 3.619 | 3.671 | 3.677 | 3.668 |
| Average crystal grain size [μm] | 92.3 | 53.9 | 106 | 128 | 138 |
| Number of air bubbles of 1-5 μm [bubbles/mm$^3$] | 13552.4 | 10773.3 | 2210.5 | 3346.3 | 2913.2 |
| Closed porosity [vol %] | 2.77 | 1.91 | 0.87 | 0.85 | 0.87 |
| Transmittance (t = 1.9 mm) [%] | 38.56 | 48.58 | 71.23 | 71.65 | 72.76 |
| Clarity (t = 1.9 mm) [%] | 28.6 | 30.5 | 42.7 | 50.2 | 44.8 |
| Haze (t = 1.9 mm) [%] | 21.0 | 23.7 | 7.3 | 9.0 | 9.5 |
| Reflectance [%] | 9.87 | 10.45 | 13.77 | 13.39 | 13.68 |
| Number of air microbubble clusters [clusters/mm$^3$] | 19.0 | 41.0 | 43.2 | 29.7 | 34.9 |
| Thermal conductivity [W/m · K] | 9.47 | 9.62 | 11.38 | 11.29 | 11.32 |
| Bending strength after quenching [MPa] | 41.9 | 44.7 | 43.5 | 40.6 | 44.5 |
| Vickers hardness [GPa] | 13.71 | 13.74 | 13.82 | 14.03 | 14.01 |
| Three-point bending strength [MPa] | 168.5 | 180.2 | 229.9 | 267.3 | 237.6 |
| Transmittance (t = 0.8 mm) [%] | 60.00 | 65.41 | 78.32 | 78.63 | 79.53 |

TABLE 8-continued

|  | Example 40 | Example 41 | Example 42 | Example 43 | Example 44 |
|---|---|---|---|---|---|
| Clarity (t = 0.8 mm) [%] | 57.80 | 60.10 | 72.60 | 73.34 | 72.88 |
| Haze (t = 0.8 mm) [%] | 9.4 | 10.6 | 4.1 | 4.7 | 6.6 |
| Transmittance (t = 0.4 mm) [%] | 72.47 | 73.17 | 80.65 | 80.97 | 80.91 |
| Clarity (t = 0.4 mm) [%] | 63.67 | 64.20 | 74.48 | 77.30 | 76.96 |
| Haze (t = 0.4 mm) [%] | 5.4 | 6.3 | 2.0 | 2.5 | 4.4 |
| Intensity ratio of diffused lights (1.9 mm/1°) [%] | 6.79 | 6.52 | 7.11 | 5.59 | 5.34 |
| Intensity ratio of diffused lights (1.9 mm/2°) [%] | 0.91 | 0.82 | 0.76 | 0.59 | 0.74 |
| Intensity ratio of diffused lights (1.9 mm/3°) [%] | 0.25 | 0.22 | 0.17 | 0.13 | 0.21 |
| Intensity ratio of diffused lights (0.8 mm/1°) [%] | 3.43 | 3.32 | 3.33 | 3.02 | 3.10 |
| Intensity ratio of diffused lights (0.8 mm/2°) [%] | 0.38 | 0.35 | 0.33 | 0.20 | 0.19 |
| Intensity ratio of diffused lights (0.8 mm/3°) [%] | 0.12 | 0.10 | 0.09 | 0.06 | 0.05 |
| Intensity ratio of diffused lights (0.4 mm/1°) [%] | 1.56 | 1.52 | 1.59 | 1.54 | 1.58 |

Example 45

A ceramic sintered body was manufactured in the same manner as in Example 5 except that in the production step of the ceramic sintered body of Example 5, the temperature rise rate up to 1,500° C. in the firing step was set to 1,200° C./h and the temperature rise rate at 1,500° C. or more was set to 600° C./h. The amounts of respective components (including the amount of impurities) of the ceramic sintered body, the number of air bubbles, respective physical property values, etc. were measured in the same manner as in Example 1. The results obtained are shown in Table 9. In the AlON sintered body of Example 45, the number of air bubbles each having a pore size of 1 μm or more and less than 5 μm is large, the number of air microbubble clusters is also large, the average crystal grain size is small, and therefore, not only the transmittance and clarity are low but also the haze is small.

Example 46

A ceramic sintered body was manufactured in the same manner as in Example 5 except that in the production step of the ceramic sintered body of Example 5, the secondary firing time was changed to 20 hours. The amounts of respective components (including the amount of impurities) of the ceramic sintered body, the number of air bubbles, respective physical property values, etc. were measured in the same manner as in Example 1. The results obtained are shown in Table 9. In the AlON sintered body of Example 46, the number of air bubbles each having a pore size of 1 μm or more and less than 5 μm is large, the number of air microbubble clusters is also large, the average crystal grain size is too large, and therefore, not only the transmittance and clarity are low but also the thermal shock resistance is small.

Example 47

A ceramic sintered body was manufactured in the same manner as in Example 5 except that in the production step of the ceramic sintered body of Example 5, lithium fluoride (LiF) was used as the Li₂O source. The amounts of respective components (including the amount of impurities) of the ceramic sintered body, the number of air bubbles, respective physical property values, etc. were measured in the same manner as in Example 1. The results obtained are shown in Table 9. In the AlON sintered body of Example 47, the number of air bubbles each having a pore size of 1 μm or more and less than 5 μm is large, the number of air microbubble clusters is also large, and therefore, the transmittance and clarity are low.

Example 48

Example 48 is a commercially available AlON sintered body (pressure-sintered body). The amounts of respective components (including the amount of impurities) of the AlON sintered body of Example 48, the number of air bubbles, respective physical property values, etc. were measured in the same manner as in Example 1. The results obtained are shown in Table 9. In the AlON sintered body of Example 48, air bubbles are not contained and the average crystal grain size is large, whereby the reflectance and thermal conductivity are high and the thermal shock resistance is low.

Example 49

Example 49 is a commercially available single-crystal sapphire. The amounts of respective components (including the amount of impurities) of the single-crystal sapphire of Example 49, the number of air bubbles, respective physical property values, etc. were measured in the same manner as in Example 1. The results obtained are shown in Table 9. Since the single-crystal sapphire of Example 49 does not contain air bubbles and is a single crystal body, the thermal shock resistance is significantly low.

TABLE 9

|  | Example 45 | Example 46 | Example 47 | Example 48 | Example 49 |
|---|---|---|---|---|---|
| Al₂O₃ [mol %] | 70 | 70 | 70 | 71.9 | 100 |
| AlN [mol %] | 30 | 30 | 30 | 28.1 | N.D |

TABLE 9-continued

|  | Example 45 | Example 46 | Example 47 | Example 48 | Example 49 |
|---|---|---|---|---|---|
| $Y_2O_3$ [wt %] | 0.089 | 0.061 | 0.063 | 0.004 | N.D |
| $Li_2O$ [wt %] | 0.084 | 0.069 | 0.065 | N.D | N.D |
| MgO [wt %] | 0.129 | 0.083 | 0.075 | 0.028 | N.D |
| $MgO/Li_2O$ Ratio | 1.54 | 0.78 | 1.16 | — | N.D |
| CaO [wt %] | 0 | 0 | 0 | 0 | N.D |
| $SiO_2$ [wt %] | 0 | 0 | 0 | 0 | N.D |
| $Na_2O$ [wt %] | 0 | 0 | 0 | 0 | N.D |
| $SnO_2$ [wt %] | 0 | 0 | 0 | 0 | N.D |
| $La_2O_3$ [wt %] | 0 | 0 | 0 | 0 | N.D |
| C [wtppm] | 51 | 39 | 54 | 4 | 6 |
| F [wtppm] | 0 | 0 | 23 | 0 | 0 |
| Other impurities [wt %] | 0.006 | 0.005 | 0.005 | N.D | 0.004 |
| Crystal structure | cubic | cubic | cubic | cubic | hexagonal |
| Density [g/cm$^3$] | 3.621 | 3.650 | 3.589 | 3.709 | 3.970 |
| Average crystal grain size [μm] | 41.0 | 252 | 78.4 | 254 | (single crystal) |
| Number of air bubbles of 1-5 μm [bubbles/mm$^3$] | 11011.4 | 5905.7 | 12196.4 | 0 | 0 |
| Closed porosity [vol %] | 2.04 | 1.24 | 2.56 | 0 | 0 |
| Transmittance (t = 1.9 mm) [%] | 71.19 | 62.71 | 27.6 | 85.12 | 85.46 |
| Clarity (t = 1.9 mm) [%] | 44.30 | 67.32 | 24.60 | 94.60 | 98.30 |
| Haze (t = 1.9 mm) [%] | 19.6 | 9.9 | 25.3 | 0.7 | 0.4 |
| Reflectance [%] | 12.82 | 13.31 | 9.03 | 14.53 | 14.35 |
| Number of air microbubble clusters [clusters/mm$^3$] | 47.6 | 23.2 | 47.1 | 0 | 0 |
| Thermal conductivity [W/m·K] | 9.78 | 10.72 | 9.13 | 12.6 | 42 |
| Bending strength after quenching [MPa] | 58.2 | 39.2 | 53.0 | 38.8 | 26.7 |
| Vickers hardness [GPa] | 13.80 | 13.92 | 13.60 | 14.23 | 11.66 |
| Three-point bending strength [MPa] | 211.2 | 245.3 | 163.2 | 310.0 | 553.0 |
| Transmittance (t = 0.8 mm) [%] | 76.17 | 74.59 | 52.35 | 85.19 | 85.50 |
| Clarity (t = 0.8 mm) [%] | 71.70 | 84.76 | 53.20 | 97.60 | 98.70 |
| Haze (t = 0.8 mm) [%] | 9.3 | 6.9 | 12.3 | 0.1 | 0.1 |
| Transmittance (t = 0.4 mm) [%] | 79.33 | 79.57 | 67.32 | 85.21 | 85.53 |
| Clarity (t = 0.4 mm) [%] | 73.10 | 89.86 | 59.60 | 98.30 | 98.90 |
| Haze (t = 0.4 mm) [%] | 5.9 | 4.3 | 8.4 | 0.0 | 0.0 |
| Intensity ratio of diffused lights (1.9 mm/1°) [%] | 5.28 | 2.69 | 7.82 | 0.91 | 0.76 |
| Intensity ratio of diffused lights (1.9 mm/2°) [%] | 0.72 | 0.23 | 1.03 | 0.09 | 0.07 |
| Intensity ratio of diffused lights (1.9 mm/3°) [%] | 0.21 | 0.08 | 0.28 | 0.02 | 0.01 |
| Intensity ratio of diffused lights (0.8 mm/1°) [%] | 3.40 | 1.69 | 3.50 | 0.81 | 0.69 |
| Intensity ratio of diffused lights (0.8 mm/2°) [%] | 0.33 | 0.17 | 0.41 | 0.08 | 0.06 |
| Intensity ratio of diffused lights (0.8 mm/3°) [%] | 0.09 | 0.06 | 0.15 | 0.01 | 0.01 |
| Intensity ratio of diffused lights (0.4 mm/1°) [%] | 1.57 | 1.13 | 1.62 | 0.68 | 0.62 |

This application is based on Japanese Patent Application No. 2017-047635 filed on Mar. 13, 2017, the contents of which are incorporated herein by way of reference.

INDUSTRIAL APPLICABILITY

The light-transmitting ceramic sintered body of the present invention is inexpensive and excellent in the transparency and visibility and therefore, is useful for various transparent members.

The invention claimed is:

1. A light-transmitting ceramic sintered body containing air bubbles each having a pore size of 1 μm or more and less than 5 μm in an amount of 10 bubbles/mm$^3$ or more and 4,000 bubbles/mm$^3$ or less, and having a closed porosity of 0.01 vol % or more and 1.05 vol % or less;
having an average transmittance of a test specimen of the light-transmitting ceramic sintered body having a thickness of 1.90 mm of 70% or more with respect to a visible spectrum with a wavelength of 500 to 900 nm, and a clarity in a comb width of 0.5 mm of a test specimen of the light-transmitting ceramic sintered body having a thickness of 1.90 mm of 60% or more;
having a main blending component of the light-transmitting ceramic sintered body comprising 66% or more of $Al_2O_3$ in molar percentage and comprising, in mass percentage based on oxides, 0.002% or more and 0.19% or less of $Li_2O$.

2. The light-transmitting ceramic sintered body according to claim 1, having a haze of 7% or less with respect to the visible spectrum with the wavelength of 500 to 900 nm.

3. The light-transmitting ceramic sintered body according to claim 1, having a reflectance of 14.5% or less with respect to the visible spectrum with the wavelength of 500 to 900 nm.

4. The light-transmitting ceramic sintered body according to claim 1, wherein when air bubbles present in a range of 200 μm in a thickness are projected to overlap each other and observed, air bubbles each having a pore size of 200 nm to less than 1 μm are closely clustered in an amount of 6,000 bubbles/mm$^2$ or more to form air bubble clusters each having a diameter of 20 μm or more, and the number of air bubble clusters is less than 40 clusters/mm$^3$ that is measured by scanning the range of 200 μm in thickness at an arbitrary place of a sample at intervals of 1 μm using a digital microscope at a 3,000 times magnification, and the images are projected to overlap each other to obtain an image for counting the number of bubbles and repeating the measurement by changing the position of the samples to obtain imaging in the range of 5 mm$^2$ and the number of clusters of 20 μm or more in diameter, each formed of air bubbles and each having a pore size of 200 nm to less than 1 μm that are clostered in an amount of 6,000 bubbles/mm$^2$ or more by visual counting.

5. The light-transmitting ceramic sintered body according to claim 1, wherein the main blending component of the light-transmitting ceramic sintered body further comprises 22% to 34% of AlN in molar percentage.

6. The light-transmitting ceramic sintered body according to claim 1, comprising, in mass percentage based on oxides, 0.02% to 0.21% of $Y_2O_3$.

7. The light-transmitting ceramic sintered body according to claim 1, comprising, in mass percentage based on oxides, 0.004% to 0.23% of MgO.

8. The light-transmitting ceramic sintered body according to claim 1, comprising, in mass percentage based on oxides, 0.002% to 0.30% of CaO.

9. The light-transmitting ceramic sintered body according to claim 1, comprising, in mass percentage based on oxides, 0.002% to 0.15% of at least one selected from the group consisting of $Na_2O$, $SiO_2$, $SnO_2$, and $La_2O_3$.

10. The light-transmitting ceramic sintered body according to claim 1, having a carbon content of 15 to 250 ppm by mass.

11. The light-transmitting ceramic sintered body according to claim 1, having an average crystal grain size of crystal grains constituting the light-transmitting ceramic sintered body of 60 μm to 250 μm.

12. The light-transmitting ceramic sintered body according to claim 1, having a crystal structure of a cubic structure.

13. A light-transmitting ceramic sintered body containing air bubbles each having a pore size of 1 μm or more and less than 5 μm in an amount of 10 bubbles/mm$^3$ or more and 4,000 bubbles/mm$^3$ or less, and having a closed porosity of 0.01 vol % or more and 1.05 vol % or less;

having an average transmittance of a test specimen of the light-transmitting ceramic sintered body having a thickness of 0.80 mm of 74% or more with respect to a visible spectrum with a wavelength of 500 to 900 nm, and a clarity in a comb width of 0.5 mm of a test specimen of the light-transmitting ceramic sintered body having a thickness of 0.80 mm of 75% or more;

having a main blending component of the light-transmitting ceramic sintered body comprising 66% or more of $Al_2O_3$ in molar percentage based on oxides, 0.002% or more and 0.19% or less of $Li_2O$.

14. The light-transmitting ceramic sintered body according to claim 13, wherein the main blending component of the light-transmitting ceramic sintered body further comprises 22% to 34% of AlN in molar percentage.

15. The light-transmitting ceramic sintered body according to claim 13, having a carbon content of 15 ppm to 250 ppm by mass.

16. A light-transmitting ceramic sintered body containing air bubbles each having a pore size of 1 μm or more and less than 5 μm in an amount of 10 bubbles/mm$^3$ or more and 4,000 bubbles/mm$^3$ or less, and having a closed porosity of 0.01 vol % or more and 1.05 vol % or less;

having an average transmittance of a test specimen of the light-transmitting ceramic sintered body having a thickness of 0.40 mm of 78% or more with respect to a visible spectrum with a wavelength of 500 to 900 nm, and a clarity in a comb width of 0.5 mm of a test specimen of the light-transmitting ceramic sintered body having a thickness of 0.40 mm of 80% or more;

having a main blending component of the light-transmitting ceramic sintered body comprises 66% or more of $Al_2O_3$ in molar percentage and comprising, in mass percentage based on oxides, 0.002% or more and 0.19% or less of $Li_2O$.

17. The light-transmitting ceramic sintered body according to claim 16, wherein the main blending component of the light-transmitting ceramic sintered body further comprises 22% to 34% of AlN in molar percentage.

18. The light-transmitting ceramic sintered body according to claim 16, having a carbon content of 15 ppm to 250 ppm by mass.

\* \* \* \* \*